US012332703B2

(12) United States Patent
Liao et al.

(10) Patent No.: US 12,332,703 B2
(45) Date of Patent: Jun. 17, 2025

(54) HINGE AND MOBILE TERMINAL

(71) Applicant: HUAWEI TECHNOLOGIES CO., LTD., Guangdong (CN)

(72) Inventors: Changliang Liao, Dongguan (CN); Weifeng Wu, Dongguan (CN); Li Liao, Dongguan (CN); Kenji Nagai, Yokohama (JP); Ding Zhong, Dongguan (CN); Qiao Deng, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/420,170

(22) Filed: Jan. 23, 2024

(65) Prior Publication Data
US 2024/0160253 A1 May 16, 2024

Related U.S. Application Data

(63) Continuation of application No. 17/950,501, filed on Sep. 22, 2022, now Pat. No. 11,914,433, which is a (Continued)

(30) Foreign Application Priority Data

Dec. 13, 2019 (CN) .......................... 201911286336.8

(51) Int. Cl.
*G06F 1/16* (2006.01)
*F16C 11/04* (2006.01)
(Continued)

(52) U.S. Cl.
CPC ............ *G06F 1/1681* (2013.01); *F16C 11/04* (2013.01); *G06F 1/1616* (2013.01);
(Continued)

(58) Field of Classification Search
CPC combination set(s) only.
See application file for complete search history.

(56) References Cited

U.S. PATENT DOCUMENTS 9,348,450 B1  5/2016  Kim
9,572,272 B2  2/2017  Lee
(Continued)

FOREIGN PATENT DOCUMENTS

CN    1681380 A    10/2005
CN   102597904 A    7/2012
(Continued)

*Primary Examiner* — Lisa Lea-Edmonds
(74) *Attorney, Agent, or Firm* — WOMBLE BOND DICKINSON (US) LLP

(57) ABSTRACT

A hinge and a mobile terminal to resolve poor use effect of a foldable electronic device. The hinge includes a main body, and a first folding assembly and a second folding assembly that are symmetrically disposed along the main body. When the first folding assembly and the second folding assembly are rotated toward each other, a length of the hinge can be extended, and an accommodation space for accommodating the flexible display can be formed. When the first folding assembly and the second folding assembly are rotated away from each other, the length of the hinge can be reduced, and a support surface for supporting the flexible display can be formed, so that the flexible display cannot be stretched, compressed, or the like during folding and unfolding, thereby improving the use effect and safety of the mobile terminal.

25 Claims, 10 Drawing Sheets

Related U.S. Application Data continuation of application No. 17/118,992, filed on Dec. 11, 2020, now Pat. No. 11,467,633.

(51) Int. Cl.
  *H04M 1/02*      (2006.01)
  *E05D 3/12*      (2006.01)
(52) U.S. Cl.
  CPC ........ *G06F 1/1652* (2013.01); *H04M 1/0268* (2013.01); *E05D 3/122* (2013.01); *E05Y 2201/604* (2013.01); *E05Y 2999/00* (2024.05)

(56) References Cited

U.S. PATENT DOCUMENTS

| | | | |
|---|---|---|---|
| 9,696,763 | B2 | 7/2017 | Mok et al. |
| 9,848,502 | B1 * | 12/2017 | Chu .................. G06F 1/1681 |
| 10,545,541 | B1 | 1/2020 | Dighde et al. |
| 10,564,681 | B2 | 2/2020 | Siddiqui |
| 10,664,021 | B1 | 5/2020 | Hsu et al. |
| 10,754,377 | B2 | 8/2020 | Siddiqui |
| 10,761,572 | B1 | 9/2020 | Siddiqui et al. |
| 11,231,754 | B2 | 1/2022 | Kang et al. |
| 11,243,578 | B2 | 2/2022 | Torres et al. |
| 11,294,431 | B2 | 4/2022 | Torres et al. |
| 11,336,759 | B2 * | 5/2022 | Liao ................... H04M 1/022 |
| 11,467,633 | B2 * | 10/2022 | Liao .................... F16C 11/04 |
| 11,522,985 | B1 | 12/2022 | Lim et al. |
| 11,703,916 | B2 * | 7/2023 | Tian ................... G06F 1/1616 |
| | | | 361/679.27 |
| 11,706,886 | B2 * | 7/2023 | Wu .................... G06F 1/1681 |
| | | | 361/807 |
| 11,726,530 | B2 | 8/2023 | Kang et al. |
| 11,846,997 | B2 * | 12/2023 | Liao ................... H04M 1/0216 |
| 11,914,433 | B2 * | 2/2024 | Liao ................... G06F 1/1652 |
| 11,933,351 | B2 * | 3/2024 | Jiang ................... F16C 11/04 |
| 11,937,390 | B2 * | 3/2024 | Feng ................... G06F 1/1681 |
| 12,047,521 | B2 * | 7/2024 | Liao ................... H04M 1/022 |
| 12,081,686 | B2 * | 9/2024 | Nagai .................. F16C 11/04 |
| 2017/0139446 | A1 | 5/2017 | Lan et al. |
| 2017/0142240 | A1 | 5/2017 | Xu |
| 2018/0292860 | A1 | 10/2018 | Siddiqui |
| 2019/0032380 | A1 * | 1/2019 | Wu ..................... H04M 1/022 |
| 2019/0268456 | A1 | 8/2019 | Park et al. |
| 2019/0278338 | A1 | 9/2019 | Siddiqui |
| 2020/0029449 | A1 | 1/2020 | Makinen et al. |
| 2020/0348732 | A1 | 11/2020 | Kang et al. |
| 2020/0355216 | A1 | 11/2020 | Bae et al. |
| 2021/0034116 | A1 | 2/2021 | Torres et al. |
| 2021/0034117 | A1 | 2/2021 | Torres et al. |
| 2021/0041921 | A1 | 2/2021 | Kang et al. |
| 2021/0165466 | A1 | 6/2021 | Kang et al. |
| 2021/0181808 | A1 * | 6/2021 | Liao ................... G06F 1/1652 |
| 2021/0271294 | A1 * | 9/2021 | Liao .................... G06F 1/181 |
| 2021/0355988 | A1 * | 11/2021 | Cheng ................. G06F 1/1681 |
| 2021/0368032 | A1 * | 11/2021 | Liao ................... G06F 1/1681 |
| 2022/0035422 | A1 | 2/2022 | Torres et al. |
| 2022/0051594 | A1 | 2/2022 | Eguchi et al. |
| 2022/0104370 | A1 * | 3/2022 | Wu .................... H05K 5/0017 |
| 2022/0113770 | A1 | 4/2022 | Kang et al. |
| 2022/0116489 | A1 * | 4/2022 | Nagai ................. G06F 1/1652 |
| 2022/0137676 | A1 * | 5/2022 | Tian ................... G06F 1/1616 |
| | | | 361/679.27 |
| 2022/0155828 | A1 | 5/2022 | Hsiang et al. |
| 2022/0164002 | A1 | 5/2022 | An et al. |
| 2022/0166456 | A1 | 5/2022 | Dannenberg et al. |
| 2022/0182476 | A1 | 6/2022 | Cha et al. |
| 2022/0303371 | A1 * | 9/2022 | Liao ................... H04M 1/0268 |
| 2022/0417351 | A1 | 12/2022 | Nam et al. |
| 2023/0054923 | A1 * | 2/2023 | Liao ................... G06F 1/1616 |
| 2023/0075646 | A1 * | 3/2023 | Niu .................... H04M 1/0268 |
| 2023/0171334 | A1 * | 6/2023 | Xu ....................... H04M 1/022 |
| | | | 455/566 |
| 2023/0251692 | A1 | 8/2023 | Kang et al. |
| 2023/0403347 | A1 * | 12/2023 | Liu .................... H04M 1/022 |
| 2024/0011522 | A1 * | 1/2024 | Jiang .................. G06F 1/1681 |
| 2024/0160253 | A1 * | 5/2024 | Liao .................. H04M 1/0268 |
| 2024/0206093 | A1 * | 6/2024 | Liao ................... H05K 5/0226 |
| 2024/0340365 | A1 * | 10/2024 | Liao ................... H04M 1/022 |
| 2024/0384751 | A1 * | 11/2024 | Wu ..................... F16C 11/04 |
| 2024/0389249 | A1 * | 11/2024 | Wu ..................... H05K 5/0226 |
| 2024/0410417 | A1 * | 12/2024 | Shen ................... H05K 5/0226 |
| 2024/0410418 | A1 * | 12/2024 | Lin .................... G06F 1/1616 |
| 2024/0418208 | A1 * | 12/2024 | Shi ..................... H05K 5/0226 |
| 2024/0426336 | A1 * | 12/2024 | Wang .................. H04M 1/022 |
| 2024/0427388 | A1 * | 12/2024 | Shen ................... H04M 1/022 |
| 2025/0027531 | A1 * | 1/2025 | Shen ................... G06F 1/1616 |
| 2025/0027532 | A1 * | 1/2025 | Shi ..................... F16C 11/04 |
| 2025/0048572 | A1 * | 2/2025 | Shi ..................... F16C 11/04 |
| 2025/0048573 | A1 * | 2/2025 | Li ...................... F16C 11/04 |
| 2025/0053203 | A1 * | 2/2025 | Nagai .................. G06F 1/16 |
| 2025/0053205 | A1 * | 2/2025 | Shen ................... H04M 1/022 |

FOREIGN PATENT DOCUMENTS

| | | |
|---|---|---|
| CN | 103167071 A | 6/2013 |
| CN | 105407187 A | 3/2016 |
| CN | 105491193 A | 4/2016 |
| CN | 205978043 U | 2/2017 |
| CN | 206100081 U | 4/2017 |
| CN | 107135288 A | 9/2017 |
| CN | 108076171 A | 5/2018 |
| CN | 207977992 U | 10/2018 |
| CN | 108769317 A | 11/2018 |
| CN | 108874048 A | 11/2018 |
| CN | 109257460 A | 1/2019 |
| CN | 208421694 U | 1/2019 |
| CN | 109495621 A | 3/2019 |
| CN | 109600466 A | 4/2019 |
| CN | 109654112 A | 4/2019 |
| CN | 109979328 A | 7/2019 |
| CN | 110007715 A | 7/2019 |
| CN | 110010008 A | 7/2019 |
| CN | 110035140 A | 7/2019 |
| CN | 110213417 A | 9/2019 |
| CN | 110273915 A | 9/2019 |
| CN | 209430596 U | 9/2019 |
| CN | 209472651 U | 10/2019 |
| CN | 110552953 A | 12/2019 |
| CN | 209724948 U | 12/2019 |
| CN | 209731301 U | 12/2019 |
| CN | 209882285 U | 12/2019 |
| CN | 110671423 A | 1/2020 |
| CN | 110985524 A | 4/2020 |
| CN | 110992833 A | 4/2020 |
| CN | 111327739 A | 6/2020 |
| CN | 210799707 U | 6/2020 |
| CN | 111615277 A | 9/2020 |
| JP | 2021513237 A | 5/2021 |
| KR | 101487189 B1 | 1/2015 |
| KR | 20160144299 A | 12/2016 |
| KR | 1020180094172 A | 8/2018 |
| KR | 1020180138494 A | 12/2018 |
| KR | 1020190065641 A | 6/2019 |
| KR | 20190079033 A | 7/2019 |
| KR | 1020190097898 A | 8/2019 |
| KR | 1020190110244 A | 9/2019 |
| KR | 102152040 B1 | 9/2020 |
| WO | 2017211115 A1 | 12/2017 |
| WO | 2018082338 A1 | 5/2018 |
| WO | 2019085891 A1 | 5/2019 |
| WO | 2019149238 A1 | 8/2019 |
| WO | 2019225930 A1 | 11/2019 |
| WO | 2020057032 A1 | 3/2020 |

* cited by examiner

HINGE AND MOBILE TERMINAL

CROSS-REFERENCE TO RELATED DISCLOSURES

This application is a continuation of U.S. patent application Ser. No. 17/950,501, filed on Sep. 22, 2022. The U.S. patent application Ser. No. 17/950,501 is a continuation of U.S. patent application Ser. No. 17/118,992, filed on Dec. 11, 2020, now U.S. Pat. No. 11,467,633. The U.S. patent application Ser. No. 17/118,992 claims priority to Chinese Patent Application No. 201911286336.8, filed on Dec. 13, 2019. All of the aforementioned patent applications are hereby incorporated by reference in their entireties.

TECHNICAL FIELD

This disclosure relates to the technical field of electronic devices, and in particular, to a hinge and a mobile terminal.

BACKGROUND

Currently, a foldable display is widely used in mobile terminals, and the foldable display is mainly implemented by a combination of a flexible display (for example, an Organic Light-emitting Diode (OLED) display) and a hinge. Because the flexible display is a relatively fragile component, the flexible display cannot withstand a heavy pressure or tension during folding. As shown in FIG. 1 and FIG. 2, a mobile terminal 01 of an inner folding type is used as an example. During folding, because a rotation radius of a flexible display 011 is less than a rotation radius of a hinge 012, if a length of the hinge 012 does not change (for example, the hinge 012 is not extended), the flexible display 011 may be compressed too much during folding, and the flexible display 011 may be damaged.

As shown in FIG. 3, to prevent the flexible display 011 from being squeezed during folding, the flexible display 011 is slidably disposed on a housing 013 by some manufacturers, so that the flexible display 011 can be prevented from being compressed through sliding relative to the housing 013. However, when the mobile terminal 01 is unfolded, a hollow area 014 is formed between an edge of the flexible display 011 and the housing 013, which reduces a screen-to-body ratio of the flexible display 011. In addition, the hollow area 014 easily accumulates impurities such as dust, and in some cases, the impurities in the hollow area 014 also hinder relative sliding between the flexible display 011 and the housing 013, which affects normal use of the mobile terminal 01.

In addition, when some mobile terminals are folded, a hinge portion may bulge outward as a whole, so that a side surface of the mobile terminal has a hollow baseball-like structure. Therefore, an overall thickness of the mobile terminal is increased, which is disadvantageous for improving portability. In addition, foreign matters are easily accumulated in a bulged baseball-shaped space, which increases risk of damage to the flexible display.

In some mobile terminals, the hinge uses a single shaft; that is, the two relatively folded portions in the mobile terminal are hinged by a rotation shaft. However, when the two portions are relatively folded, no sufficient deformation space can be provided for the flexible display, and consequently, the flexible display is creased or even damaged; and the hinge may generate a large gap after being folded, which affects integrity and closeness of the mobile terminal.

SUMMARY

This disclosure provides a hinge and a mobile terminal, where the hinge does not compress a flexible display during folding, so that a sufficient accommodation space is provided for the flexible display, a thickness of the mobile terminal does not increase after being folded, and no large gap is formed.

An embodiment of this disclosure provides a hinge, including a main body, and a first folding assembly and a second folding assembly that are symmetrically disposed along the main body, where the first folding assembly and the second folding assembly are rotatable relative to the main body toward or away from each other, so as to implement a folding function of the hinge. The first folding assembly may include a first swing link, a first swing arm, a first driven arm, and a first support plate. One end of the first swing arm is rotatably connected to the main body, and the other end is rotatably connected to the first swing link. One end of the first driven arm is rotatably connected to the main body, and the other end is slidably connected to the first swing link. Rotation axes of the first driven arm and the first swing arm on the main body are parallel to each other and do not coincide, so that a length of the first folding assembly changes when the first folding assembly is rotated relative to the main body. The second folding assembly may include a second swing link, a second swing arm, a second driven arm, and a second support plate. One end of the second swing arm is rotatably connected to the main body, and the other end is rotatably connected to the second swing link. One end of the second driven arm is rotatably connected to the main body, and the other end is slidably connected to the second swing link. Rotation axes of the second driven arm and the second swing arm on the main body are parallel to each other and do not coincide, so that a length of the second folding assembly changes when the second folding assembly is rotated relative to the main body.

When the hinge is folded, the first swing link and the second swing link rotate toward each other, the first swing link drives the first driven arm to synchronously rotate, the first swing link and the first swing arm extend relative to the first driven arm, the second swing link drives the second driven arm to synchronously rotate, and the second swing link and the second swing arm extend relative to the second driven arm to increase a length of the hinge; the first swing arm or first driven arm that is slidably connected to the first support plate drives the first support plate to rotate forward relative to the first swing link (for example, when the first swing link rotates clockwise, the first support plate rotates clockwise relative to the first swing link), and the second swing arm or second driven arm slidably that is connected to the second support plate drives the second support plate to rotate forward relative to the second swing link (for example, when the second swing link rotates counterclockwise, the second support plate rotates counterclockwise relative to the second swing link) so that the first support plate, the second support plate, and the main body enclose to form an accommodation space.

When the hinge is unfolded, the first swing link and the second swing link rotate away from each other, the first swing link drives the first driven arm to synchronously rotate, the first swing link and the first swing arm contract relative to the first driven arm, the second swing link drives the second driven arm to synchronously rotate, and the second swing link and the second swing arm contract relative to the second driven arm to reduce the length of the hinge. The first swing arm or first driven arm that is slidably connected to the first support plate drives the first support plate to rotate forward relative to the first swing link (for example, when the first swing link rotates counterclockwise, the first support plate rotates counterclockwise relative to the first swing link), and the second swing arm or second driven arm that is slidably connected to the second support plate drives the second support plate to rotate forward relative to the second swing link (for example, when the second swing link rotates clockwise, the second support plate rotates clockwise relative to the second swing link) to flatten the first support plate, the second support plate, and the main body to form a support surface, so that a good supporting function can be provided for the flexible display.

According to the hinge provided in an embodiment of this disclosure, when the hinge is folded, the length of the hinge can be well extended, and the first support plate, the main body, and the second support plate can gradually enclose to form an accommodation space; and when the hinge is unfolded, the length of the hinge can be well reduced, and the first support plate, the main body, and the second support plate can be gradually flattened to form a support surface. In addition, in this process, there is no obvious gap in the hinge from the appearance, so that the hinge has a better shielding effect, and integrity and safety of the hinge can be improved.

In an embodiment, to implement a rotational connection between the main body and the first swing arm, the main body may include an outer housing and an inner housing, an arc recess may be disposed in the outer housing, and an arc projection may be disposed in the inner housing. After the outer housing and the inner housing are snap-fit and fastened, the arc recess and the arc protrusion are snap-fit to form a first arc groove; that is, an arc gap is formed between the arc recess and the arc protrusion. A first arc shaft is disposed at one end of the first swing arm, and the rotational connection between the first swing arm and the main body may be implemented by fitting the first arc shaft in the first arc groove. Through the virtual shaft connection, a connection structure between the first swing arm and the main body can be well concealed in the main body, thereby improving integrity and use experience of the hinge.

To implement the rotational connection between the main body and the second swing arm, the foregoing structure for implementing the rotational connection between the main body and the first swing arm may be used. For example, the main body may include an outer housing and an inner housing that can be mutually snap-fit, an arc recess may be disposed in the outer housing, and an arc projection may be disposed in the inner housing. After the outer housing and the inner housing are snap-fit and fastened, the arc recess and the arc protrusion are snap-fit to form a second arc groove; that is, an arc gap is formed between the arc recess and the arc protrusion. A second arc shaft is disposed at one end of the second swing arm, and a rotational connection between the second swing arm and the main body may be implemented by fitting the second arc shaft in the second arc groove. Through the virtual shaft connection, a connection structure between the second swing arm and the main body can be well concealed in the main body, thereby improving integrity and use experience of the hinge.

In an embodiment, to implement a rotational connection between the first swing link and the first swing arm, a first shaft hole may be disposed at one end of the first swing arm, and a second shaft hole may be disposed at one end of the first swing link; and a pin shaft is threaded through the first shaft hole and the second shaft hole, so as to implement the rotational connection between the first swing arm and the first swing link.

Further, to implement a rotational connection between the second swing link and the second swing arm, a third shaft hole may be disposed at one end of the second swing arm, and a fourth shaft hole may be disposed at one end of the second swing link; and a pin shaft is threaded through the third shaft hole and the fourth shaft hole, so as to implement the rotational connection between the second swing arm and the second swing link.

In an embodiment, the main body and the first swing arm may be rotatably connected using a pin shaft, or may be rotatably connected in another structural form; and the main body and the second swing arm may be rotatably connected using a pin shaft, or may be rotatably connected in another structural form. This is not specifically limited in this disclosure. In addition, the first swing link and the first swing arm may be rotatably connected using a virtual shaft (for example, through cooperation between an arc groove and an arc shaft), and the second swing link and the second swing arm may also be rotatably connected using a virtual shaft (for example, through cooperation between an arc groove and an arc shaft). This is not specifically limited in this disclosure.

In addition, in an embodiment, the first driven arm and the main body are rotatably connected using a virtual shaft (for example, through cooperation between the arc groove and the arc shaft) as described above, or may be rotatably connected using a pin shaft or in another manner as described above. To implement the rotational connection between the second driven arm and the main body, the second driven arm and the main body may be rotatably connected using a virtual shaft (for example, through cooperation between the arc groove and the arc shaft) as described above, or may be rotatably connected using a pin shaft or in another manner as described above. Details are not described herein.

In an embodiment, a first sliding groove may be disposed in the first swing link, a first sliding rail may be disposed on the first driven arm, and the first sliding rail may be slidably disposed in the first sliding groove, so as to implement the sliding connection between the first driven arm and the first swing link. In an embodiment, the first sliding groove may alternatively be disposed on the first driven arm, and the first sliding rail may alternatively be disposed on the first swing link. In addition, the first sliding groove and the first sliding rail may be in various shapes. For example, cross sections of the first sliding groove and the first sliding rail are cross-shaped; or the cross sections of the first sliding groove and the first sliding rail may be trapezoidal, triangular, or the like. Details are not described in this disclosure.

In addition, a second sliding groove may be disposed in the second swing link, a second sliding rail may be disposed on the second driven arm, and the second sliding rail may be slidably disposed in the second sliding groove, so as to implement the sliding connection between the second driven arm and the second swing link. In an embodiment, the second sliding groove may alternatively be disposed on the second driven arm, and the second sliding rail may alternatively be disposed on the second swing link. In addition, the second sliding groove and the second sliding rail may be in various shapes. For example, cross sections of the second sliding groove and the second sliding rail are cross-shaped; or the cross sections of the second sliding groove and the second sliding rail may be trapezoidal, triangular, or the like. Details are not described in this disclosure.

In an embodiment, the first support plate and the first swing link may be rotatably connected using a virtual shaft as described above, or may be rotatably connected using a pin shaft, or may be rotatably connected in another manner. For example, the first swing link and the first support plate may be rotatably connected using a virtual shaft. For example, a third arc groove may be disposed on the first swing link, a third arc shaft matching the third arc groove may be disposed on the first support plate, and the third arc shaft is disposed in the third arc groove, so as to implement a rotational connection between the first support plate and the first swing link. Through the virtual shaft connection, the third arc groove and the third arc shaft can be well concealed, so that the third arc groove and the third arc shaft are not exposed, and visual integrity of the hinge can be improved.

Further, the second support plate and the second swing link may be rotatably connected using a virtual shaft as described above, or may be rotatably connected using a pin shaft, or may be rotatably connected in another manner. For example, the second swing link and the second support plate may be rotatably connected using a virtual shaft. For example, a fourth arc groove may be disposed on the second swing link, a fourth arc shaft matching the fourth arc groove may be disposed on the second support plate, and the fourth arc shaft is disposed in the fourth arc groove, so as to implement a rotational connection between the second support plate and the second swing link. Through the virtual shaft connection, the fourth arc groove and the fourth arc shaft can be well concealed, so that the fourth arc groove and the fourth arc shaft are not exposed, and visual integrity of the hinge can be improved.

In an embodiment, to enable the first support plate to rotate relative to the first swing link during folding of the hinge, the first support plate can be slidably connected to the first driven arm, so that the first driven arm can drive the first support plate to rotate relative to the first swing link. For example, a third sliding groove may be disposed on the first support plate, a first positioning shaft may be disposed on the first driven arm, and the first positioning shaft is slidably disposed in the third sliding groove. When a relative sliding movement occurs between the first driven arm and the first swing link, the first positioning shaft pushes against a side wall of the third sliding groove to rotate the first support plate around the first swing link. In an embodiment, the third sliding groove may be an arc groove, a rectilinear groove, an irregular curvilinear groove, or the like. In actual disclosure, a shape of the third sliding groove can be adjusted based on a target movement track of the first support plate.

In addition, in an embodiment, to enable the second support plate to rotate relative to the second swing link during folding of the hinge, the second support plate can be slidably connected to the second driven arm, so that the second driven arm can drive the second support plate to rotate relative to the second swing link. For example, a fourth sliding groove may be disposed on the second support plate, a second positioning shaft may be disposed on the second driven arm, and the second positioning shaft is slidably disposed in the fourth sliding groove. When a relative sliding movement occurs between the second driven arm and the second swing link, the second positioning shaft pushes against a side wall of the fourth sliding groove to rotate the second support plate around the second swing link. In an embodiment, the fourth sliding groove may be an arc groove, a rectilinear groove, an irregular curvilinear groove, or the like. In actual disclosure, a shape of the fourth sliding groove can be adjusted based on a target movement track of the second support plate.

In an embodiment, the first support plate may further be slidably connected to the first swing arm to enable the first support plate to rotate relative to the first swing link during folding of the hinge. For example, a third sliding groove may be disposed on the first support plate, a first positioning shaft may be disposed on the first swing arm, and the first positioning shaft is slidably disposed in the third sliding groove. When the first driven arm and the first swing link are relatively rotated, the first positioning shaft pushes against a side wall of the third sliding groove to rotate the first support plate around the first swing link. In an embodiment, the third sliding groove may be an arc groove, a rectilinear groove, an irregular curvilinear groove, or the like. In actual disclosure, a shape of the third sliding groove can be adjusted based on a target movement track of the first support plate.

In an embodiment, the second support plate may further be slidably connected to the second swing arm to enable the second support plate to rotate with respect to the second swing link during folding of the hinge. For example, a fourth sliding groove may be disposed on the second support plate, a second positioning shaft may be disposed on the second swing arm, and the second positioning shaft is slidably disposed in the fourth sliding groove. When the second driven arm and the second swing link are relatively rotated, the second positioning shaft pushes against a side wall of the fourth sliding groove to rotate the second support plate around the second swing link. In an embodiment, the fourth sliding groove may be an arc groove, a rectilinear groove, an irregular curvilinear groove, or the like. In actual disclosure, a shape of the fourth sliding groove can be adjusted based on a target movement track of the second support plate.

In addition, in an embodiment, the third sliding groove may alternatively be disposed on the first driven arm or the first swing arm, and the first positioning shaft may be disposed on the first support plate, so as to implement a sliding connection between the first driven arm and the first support plate, or a sliding connection between the first swing arm and the first support plate. In addition, in an embodiment, the fourth sliding groove may alternatively be disposed on the second driven arm or the second swing arm, and the second positioning shaft may be disposed on the second support plate, so as to implement a sliding connection between the second driven arm and the second support plate, or a sliding connection between the second swing arm and the second support plate.

In addition, in an embodiment, to ensure that the first folding assembly and the second folding assembly can synchronously move during folding and unfolding of the hinge, the hinge may further include a synchronization assembly, so as to implement synchronous reverse rotation (synchronous rotation toward each other and synchronous rotation away from each other) between the first folding assembly and the second folding assembly.

In an embodiment, the synchronization assembly may be in various structural forms, and may have various connection relationships with the first folding assembly and the second folding assembly.

For example, the synchronization assembly may include a gear structure and be drivingly connected to a first driven arm in the first folding assembly and a second driven arm in the second folding assembly. For example, the synchronization assembly may include a first gear and a second gear that are engaged with each other, the first gear is fastened to one end of the first driven arm (in an embodiment, the gear structure may alternatively be directly formed at the right end of the first driven arm), the second gear is fastened to one end of the second driven arm (in an embodiment, the gear structure may alternatively be directly formed at the left end of the second driven arm), an axis of the first gear coincides with a rotation axis the first driven arm on the main body, and an axis of the second gear coincides with a rotation axis of the second driven arm on the main body.

In addition, in an embodiment, the synchronization assembly may include more gears. For example, the synchronization assembly may further include an even number of driven gears, and the first and second gears may be drivingly connected using an even number of driven gears, so as to implement synchronous reverse rotation (synchronous rotation toward each other and synchronous rotation away from each other) between the first folding assembly and the second folding assembly.

In addition, to provide a certain damping effect or self-hovering capability during folding and unfolding of the hinge, in an embodiment, the hinge may further include a damping assembly; and the damping assembly may be drivingly connected to the first folding assembly and the second folding assembly to provide a damping force or a self-hovering effect when the first folding assembly and the second folding assembly are rotated, so as to improve use experience of a user In addition, this disclosure further provides a mobile terminal, including a first housing, a second housing, a flexible display, and any one of the foregoing hinges, where the first housing and the second housing are rotatably connected using the hinge.

In an implementation, the first housing may be fixedly connected to a first swing link, and a second housing may be fixedly connected to a second swing link. For example, the first housing may be fixedly connected to the first swing link by using screws or through welding, bonding, or the like, and the second housing may also be fixedly connected to the second swing link by screws or through welding or bonding, or the like. In actual disclosure, devices such as a processor, a battery, and a camera may be disposed in the first housing and the second housing.

In addition, in an embodiment, a mobile terminal may include a flexible display (for example, an OLED display), where a part of the flexible display may be fixedly connected to the first housing, and another part may be fixedly connected to the second housing. A length of the hinge can be extended or reduced as a folding angle changes during folding and unfolding of the hinge, the first swing link is fixedly connected to the first housing, and the second swing link is fixedly connected to the second housing. Therefore, during folding and unfolding of the mobile terminal, the length of the connection between the first housing, the hinge, and the second housing is extended or reduced, so that neither pressing force nor stretching force is imposed on the flexible display. When the mobile terminal is gradually unfolded, the length of the hinge is gradually reduced; and when the mobile terminal is fully unfolded (an included angle between the first housing and the second housing is 180°), the first support plate, the inner housing and the second support plate form a flat support surface, so that a good supporting function can be provided for the flexible display. When the mobile terminal is gradually folded, the length of the hinge is gradually extended, so that no compressive force is imposed on the flexible display. In addition, the first support plate, the inner housing, and the second support plate gradually enclose to form an accommodation space for accommodating the flexible display (a shape of cross section of the accommodation space may be similar to a water drop shape), so as to prevent the flexible display from being bent at a large angle, thereby avoiding occurrence of undesirable phenomena such as creases.

DESCRIPTION OF EMBODIMENTS

To make the objectives, technical solutions, and advantages of this disclosure clearer, the following further describes this disclosure in detail with reference to the accompanying drawings.

To facilitate understanding of the hinge provided in the embodiments of the present invention, the following first describes the disclosure scenario of the hinge.

Figure 1:
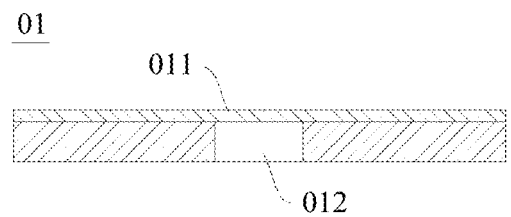
FIG. 1 is a schematic cross-sectional structural diagram of a mobile terminal in a fully unfolded state according to an embodiment of this disclosure.
Figure 2:
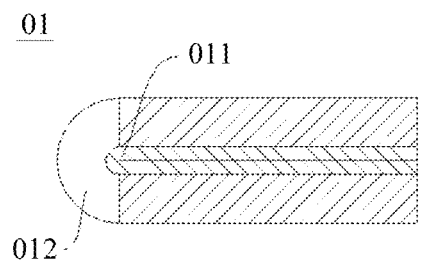
FIG. 2 is a schematic cross-sectional structural diagram of a mobile terminal in a folded state according to an embodiment of this disclosure.
Figure 3:
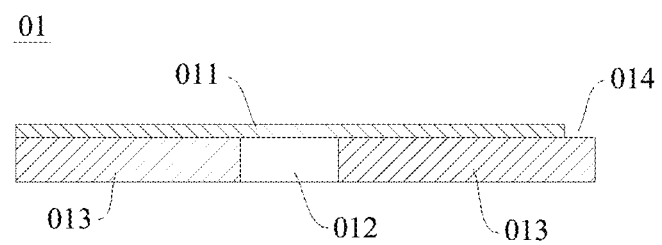
FIG. 3 is a schematic cross-sectional structural diagram of another mobile terminal in a fully unfolded state according to an embodiment of this disclosure.
Figure 4:
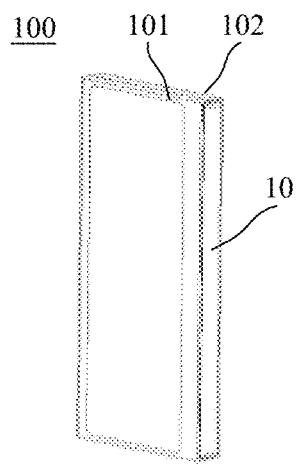
FIG. 4 is a schematic structural diagram of a mobile terminal in a folded state according to an embodiment of this disclosure.
Figure 5:
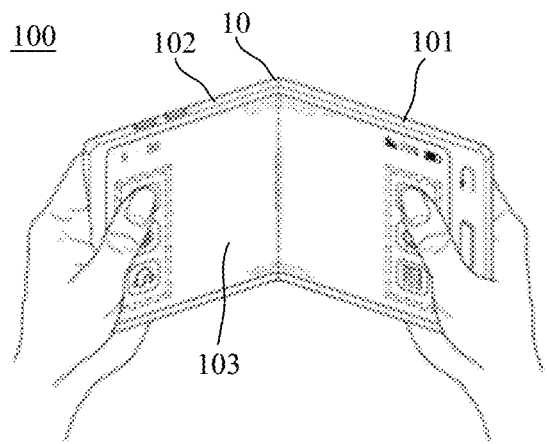
FIG. 5 is a schematic structural diagram of a mobile terminal in an unfolded state according to an embodiment of this disclosure.

The hinge provided in the embodiments of this disclosure can be applied to a foldable mobile terminal, where the foldable mobile terminal is an electronic device capable of changing its own shape through folding, rotating, or the like. Under different usage requirements, a user can fold and unfold the foldable mobile terminal to meet different requirements of the user. For example, as shown in FIG. 4, when the user needs to carry the foldable mobile terminal 100 with him, the foldable mobile terminal 100 may be folded to reduce the volume of the mobile terminal 100, thereby improving portability. As shown in FIG. 5, when the user is using the foldable mobile terminal 100, the mobile terminal 100 can be unfolded to provide a larger display area and operation area, thereby improving use convenience. In actual disclosure, the foldable mobile terminal 100 may fall into various types. For example, the foldable mobile terminal 100 may be a mobile phone, a tablet computer, a notebook computer, or an electronic book.

For example, the mobile phone may include a first housing 101 and a second housing 102 that are connected using a hinge 10. Under the action of the hinge 10, the first housing 101 and the second housing 102 may be relatively rotated, moved, or the like. A flexible display 103 (for example, an OLED display), may be disposed on surfaces of the first housing 101 and the second housing 102. When the mobile phone is deployed, the flexible display 103 may provide a large display area and operation area to improve use performance. When the mobile phone is folded, the flexible display 103 may be wrapped between the first housing 101, the hinge 10, and the second housing 102 to provide good protection for the flexible display 103, and prevent the flexible display 103 from being damaged by an external force, thereby improving safety performance of the mobile phone.

During folding and unfolding of the mobile phone, because the hinge 10 is located outside the flexible display 103, a rotation radius of the hinge 10 is greater than a rotation radius of the flexible display 103. In the hinge 10 provided in an embodiment of this disclosure, to avoid stretching or compressing the flexible display 103, a length of the hinge 10 changes during folding and unfolding of the mobile phone. For example, during folding of the mobile phone, the length of the hinge 10 can be extended, so as to avoid a compressive force on the flexible display 103; and during unfolding of the mobile phone, the length of the hinge 10 can be reduced, so as to avoid stretching force on the flexible display 103. In addition, in the folding process, the inner side of the hinge 10 is folded toward the outer side to form a space for accommodating the flexible display 103, thereby preventing the flexible display 103 from being squeezed and causing defects such as creases. In addition, no significant bulges or gaps will be formed on the outer side of the hinge 10, and therefore, integrity of the overall thickness and appearance of the mobile phone can be effectively ensured.

To make the objectives, technical solutions, and advantages of this disclosure clearer, the following further describes this disclosure in detail with reference to the accompanying drawings and specific embodiments.

The terms used in the following embodiments are intended only to describe the purpose of a particular embodiment and are not intended to limit this disclosure. The terms "one", "a" and "this" of singular forms used in this specification and the appended claims of this disclosure are also intended to include plural forms, unless otherwise specified in the context clearly. It should also be understood that in the following embodiments of this disclosure, "at least one" and "one or more" mean one or two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects.

Reference to "one embodiment", "some embodiments" or the like described in this specification means that one or more embodiments of this disclosure include a particular feature, structure, or characteristic described with reference to the embodiment. Therefore, the expressions "in one embodiment", "in some embodiments", "in some other embodiments" that appear in different parts of this specification do not necessarily mean reference to the same embodiment, but mean "one or more embodiments but not all embodiments", unless otherwise specially emphasized. The terms "include", "comprise", "have", and variations thereof mean "include, but are not limited to", unless otherwise specifically emphasized.

Figure 6:
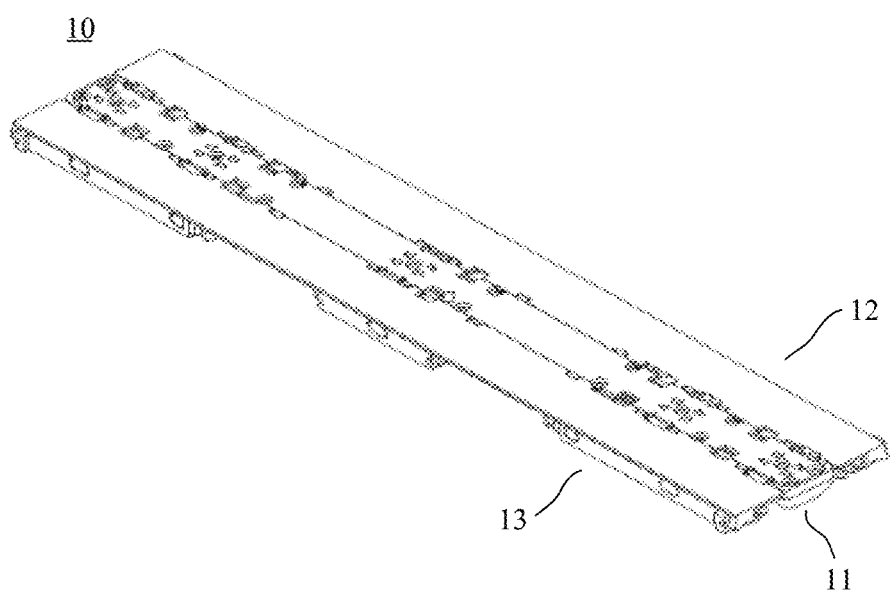
FIG. 6 is a schematic structural diagram of a hinge according to an embodiment of this disclosure.

As shown in FIG. 6, in one embodiment of this disclosure, a hinge 10 includes a main body 11, and a first folding assembly 12 and a second folding assembly 13 that are symmetrically disposed along the main body 11. The first folding assembly 12 and the second folding assembly 13 can rotate toward or away from each other relative to the main body 11, so as to implement a folding function of the hinge 10.

Figure 7:
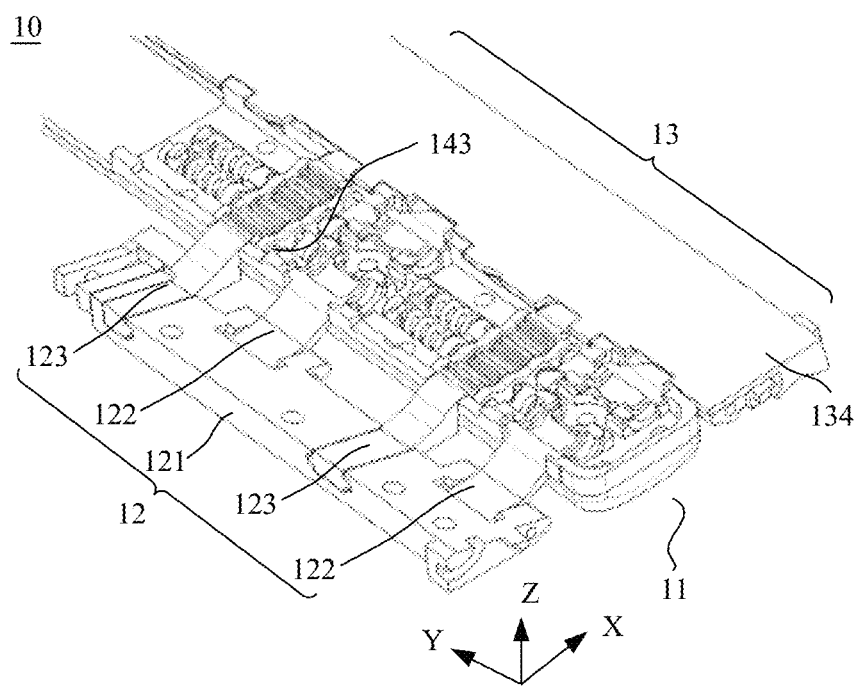
FIG. 7 is a partial schematic structural diagram of a hinge according to an embodiment of this disclosure.

Referring to FIG. 7, for example, the first folding assembly 12 may include a first swing link 121, a first swing arm 122, a first driven arm 123, and a first support plate (not shown in the figure). One end (right end in the figure) of the first swing arm 122 is rotatably connected to the main body 11, and the other end (left end in the figure) is rotatably connected to the first swing link 121. One end (right end in the figure) of the first driven arm 123 is rotatably connected to the main body 11, and the other end (left end in the figure) is slidably connected to the first swing link 121. Rotation axes of the first driven arm 123 and the first swing arm 122 on the main body 11 are parallel to each other and do not coincide, so that a length of the first folding assembly 12 changes when the first folding assembly 12 is rotated relative to the main body 11.

The first support plate 124 is rotatably connected to the first swing link 121 and slidably connected to the first swing arm 122 or the first driven arm 123. When the first folding assembly 12 is rotated relative to the main body 11, the first support plate 124 can rotate relative to the first swing link 121 under the driving force of the first swing arm 122 or the first driven arm 123, so as to provide a supporting function for the flexible display or enclose with the main body 11 to form an accommodation space for accommodating the flexible display.

Figure 8:
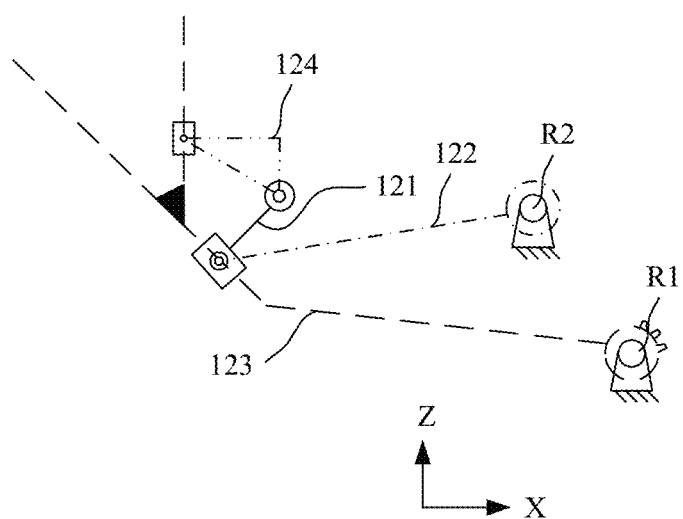
FIG. 8 is a simplified diagram of a mechanism of a first folding assembly according to an embodiment of this disclosure.

For example, FIG. 8 is a simplified diagram of a mechanism of a first folding assembly 12. The first swing link 121 (represented by a solid line in the figure), the first swing arm 122 (represented by a dash-dotted line in the figure), and the first driven arm 123 (represented by a dashed line in the figure) may constitute a crank slider mechanism through a rotational connection and a sliding connection. When an external force acts on the first swing link 121 to rotate the first swing link 121, the first swing link 121 may drive the first driven arm 123 to rotate synchronously through sliding cooperation between the first swing link 121 and the first driven arm 123, and the first swing link 121 may also drive the first swing arm 122 to rotate. Because a rotation axis R1 of the first driven arm 123 on the main body 11 and a rotation axis R2 of the first swing arm 122 on the main body 11 do not coincide, during rotation, the first swing link 121 slides relative to the first driven arm 123, causing an included angle between the first swing link 121 and the first swing arm 122 to change, and finally causing a link mechanism constituted by the first swing link 121 and the first swing arm 122 to extend or contract; that is, the length of the first folding assembly 12 may be increased or decreased. A first support plate 124 (shown as a double-dot dashed line) is rotatably connected to the first swing link 121. When the first support plate 124 is slidably connected to the first swing arm 122, the included angle between the first swing arm 122 and the first swing link 121 changes, and the first swing arm 122 can drive the first support plate 124 to rotate relative to the first swing link 121 through sliding cooperation with the first support plate 124. When the first support plate 124 is slidably connected to the first driven arm 123, the first driven arm 123 can drive the first support plate 124 to rotate relative to the first swing link 121 through sliding cooperation with the first support plate 124 after relative sliding between the first driven arm 123 and the first swing link 121.

Referring to FIG. 7 and FIG. 8, for example, the rotation axis of the first swing arm 122 on the main body 11 is offset from the rotation axis of the first driven arm 123 on the main body 11 in the positive direction of the Z-axis. When the hinge 10 is folded, an external force acts on the first swing link 121 to rotate clockwise, and the first swing link 121 drives the first swing arm 122 and the first driven arm 123 to rotate clockwise. During movement, the included angle between the first swing link 121 and the first swing arm 122 becomes larger, so that the link mechanism formed by the first swing link 121 and the first swing arm 122 is extended, so as to increase the length of the first folding assembly 12.

Figure 9:
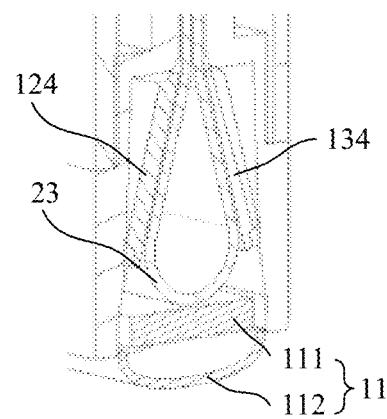
FIG. 9 is a local schematic cross-sectional structural diagram of a hinge according to an embodiment of this disclosure.

The first support plate 124 is rotatably connected to the first swing link 121. When the first support plate 124 is slidably connected to the first driven arm 123, referring to FIG. 9, during folding of the hinge 10, because the first swing link 121 slides outward relative to the first driven arm 123, the first driven arm 123 drives the first support plate 124 to rotate clockwise relative to the first swing link 121, so that an accommodation space for accommodating the flexible display (the curvilinear portion of the flexible display) is gradually formed between the first support plate 124 and the main body 11.

Figure 10:
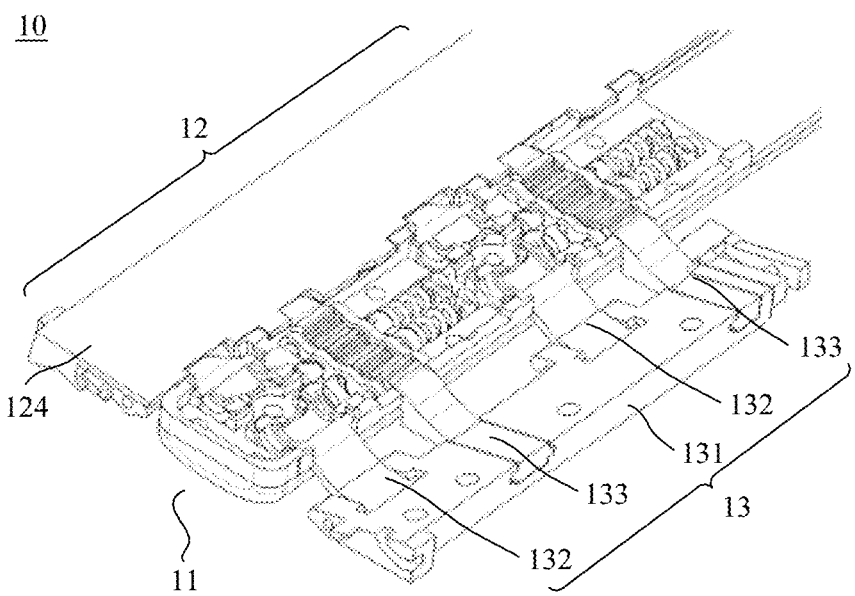
FIG. 10 is a partial schematic structural diagram of a hinge according to an embodiment of this disclosure.

As shown in FIG. 10, in one embodiment of this disclosure, the second folding assembly 13 may include a second swing link 131, a second swing arm 132, a second driven arm 133, and a second support plate (not shown in the figure). One end (left end in the figure) of the second swing arm 132 is rotatably connected to the main body 11, and the other end (right end in the figure) is rotatably connected to the second swing link 131. One end (left end in the figure) of the second driven arm 133 is rotatably connected to the main body 11, and the other end (right end in the figure) is slidably connected to the second swing link 131. Rotation axes of the second driven arm 133 and the second swing arm 132 on the main body 11 are parallel to each other and do not coincide, so that a length of the second folding assembly 13 changes when the second folding assembly 13 is rotated relative to the main body 11.

The second support plate is rotatably connected to the second swing link 131 and slidably connected to the second swing arm 132 or the second driven arm 133. When the second folding assembly 13 is rotated relative to the main body 11, the second support plate can rotate relative to the second swing link 131 under the driving force of the second swing arm 132 or the second driven arm 133 to provide a supporting function for the flexible display or to enclose with the main body 11 to form an accommodation space for accommodating the flexible display.

It can be understood that the first folding assembly 12 and the second folding assembly 13 may be disposed symmetrically relative to the main body 11, and the basic structural composition and the principle of movement of the second folding assembly 13 may be the same as those of the first folding assembly 12. Therefore, for the structural composition and the principle of movement of the second folding assembly 13, reference may be made to the foregoing description of the first folding assembly 12. Details are not described herein.

A connection structure between the components of the first folding assembly 12 and a connection structure between the first folding assembly 12 and the main body 11 are described in detail below. For a connection structure between the components of the second folding assembly 13, reference may be made to the description of the first folding assembly 12.

Figure 11:
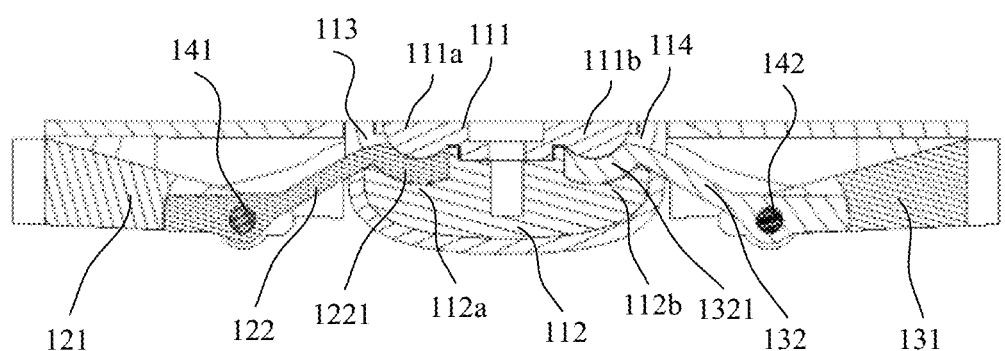
FIG. 11 is a schematic cross-sectional structural diagram of a hinge according to an embodiment of this disclosure.

As shown in FIG. 11, in one embodiment of this disclosure, for example, the first swing arm 122 and the main body 11 may be rotatably connected using a virtual shaft.

For example, the main body 11 may include an outer housing 112 and an inner housing 111, an arc recess 112a may be disposed in the outer housing 112a, and an arc projection 111a may be disposed in the inner housing 111. After the outer housing 112 and the inner housing 111 are snap-fit and fastened, the arc recess 112a and the arc projection 111a are snap-fit to form a first arc groove 113; that is, an arc gap is formed between the arc recess 112a and the arc projection 111a. A first arc shaft 1221 is disposed at one end of the first swing arm 122, and a rotational connection between the first swing arm 122 and the main body 11 may be implemented by fitting the first arc shaft 1221 into the first arc groove 113. Through the virtual shaft connection, a connection structure between the first swing arm 122 and the main body 11 can be well concealed in the main body 11, thereby improving integrity and use experience of the hinge 10.

In an embodiment, the first arc groove 113 may be one fourth of an arc, one third of an arc, or the like, and the first arc shaft 1221 may be one fourth of an arc, one third of an arc, or the like. Specific parameters of the first arc groove 113 and the first arc shaft 1221 may be adjusted by a person skilled in the art based on actual requirements. This is not specifically limited in this disclosure.

For example, the second swing arm 132 and the main body 11 may also be rotatably connected using a virtual shaft. In brief, an arc recess 112b may be disposed in the outer housing 112, and an arc projection 111b may be disposed in the inner housing 111. After the outer housing 112 and the inner housing 111 are snap-fit and fastened, the arc recess 112b and the arc projection 111b are snap-fit to form a second arc groove 114; that is, an arc gap is formed between the arc recess 112b and the arc projection 111b. A second arc shaft 1321 is disposed at one end of the second swing arm 132, and a rotational connection between the second swing arm 132 and the main body 11 may be implemented by fitting the second arc shaft 1321 in the second arc groove 114. Through the virtual shaft connection, a connection structure between the second swing arm 132 and the main body 11 can be well concealed in the main body 11, thereby improving integrity and use experience of the hinge 10.

In addition, in an embodiment, the first swing arm 122 and the main body 11 may be rotatably connected using a pin shaft or in another manner.

For example, in one embodiment of this disclosure, for example, the first swing arm 122 and the first swing link 121 may be rotatably connected using a pin shaft.

For example, a first shaft hole (not shown in the figure) is disposed at one end of the first swing arm 122 (left end in the figure), and a second shaft hole (not shown in the figure) is disposed at one end of the first swing link 121 (right end in the figure). The pin shaft 141 is threaded through the first shaft hole and the second shaft hole, so as to implement the rotational connection between the first swing arm 122 and the first swing link 121.

For example, the second swing arm 132 and the second swing link 131 may be rotatably connected using a pin shaft.

For example, a third shaft hole (not shown in the figure) may be disposed at one end of the second swing arm 132 (right end in the figure), and a fourth shaft hole (not shown in the figure) may be disposed at one end of the second swing link 131 (left end in the figure). The pin shaft 142 is threaded through the third shaft hole and the fourth shaft hole, so as to implement the rotational connection between the second swing arm 132 and the second swing link 131.

In an embodiment, the first swing arm 122 and the first swing link 121 may be rotatably connected using a virtual shaft as described above, or may be rotatably connected in another manner. The second swing arm 132 and the second swing link 131 may be rotatably connected using a virtual shaft as described above, or may be rotatably connected in another manner. This is not specifically limited in this disclosure.

In an embodiment, the first driven arm 123 and the main body 11 may be rotatably connected using a virtual shaft or pin shaft as described above, or may be rotatably connected in another manner.

For example, referring to FIG. 7, in an embodiment of this disclosure, the first driven arm 123 and the main body 11 are rotatably connected using a pin shaft. For example, a shaft hole (not shown in the figure) is disposed at one end (right end in the figure) of the first driven arm 123, and a pin shaft 143 fastened in the main body 11 is threaded through the shaft hole of the first driven arm 123, so as to implement a rotational connection between the first driven arm 123 and the main body 11.

Figure 12:
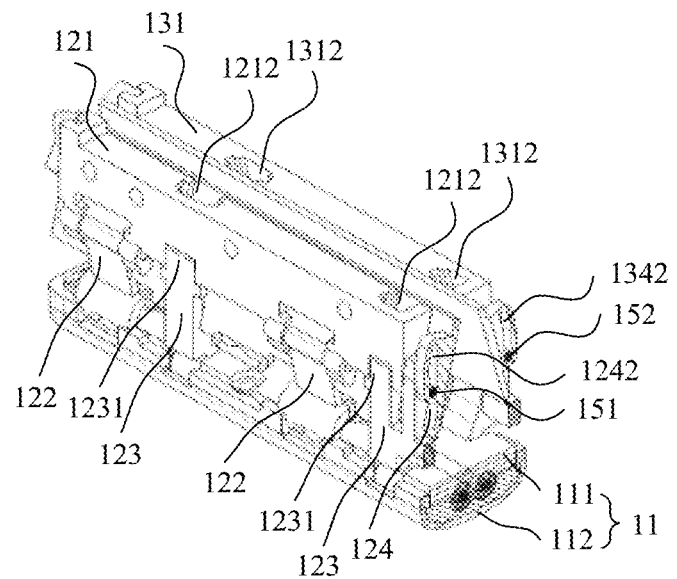
FIG. 12 is a partial schematic structural diagram of a hinge according to an embodiment of this disclosure.
Figure 13:
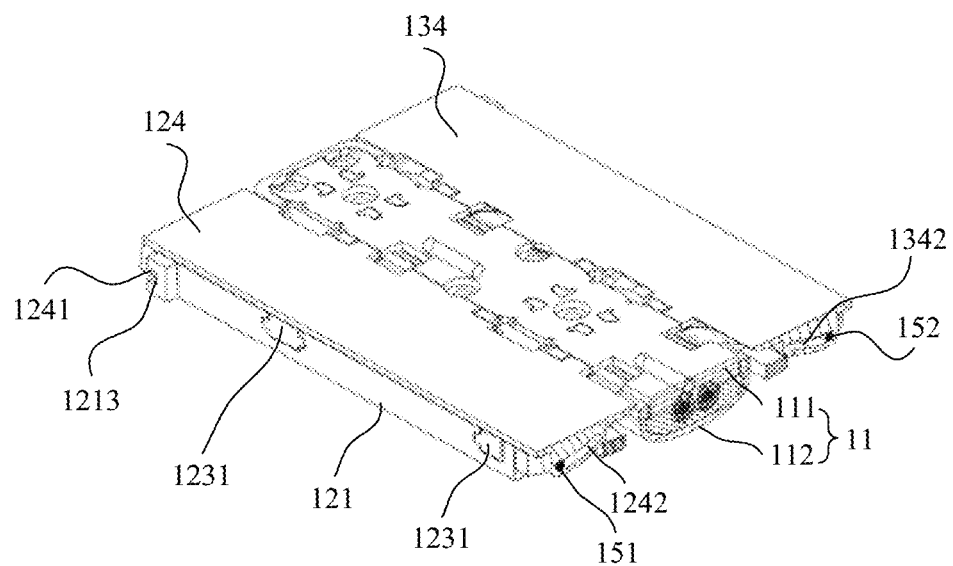
FIG. 13 is a partial schematic structural diagram of a hinge according to an embodiment of this disclosure.

In addition, as shown in FIG. 12 and FIG. 13, to implement a sliding connection between the first driven arm 123 and the first swing link 121, in an embodiment of this disclosure, a first sliding groove 1212 may be disposed in the first swing link 121, a first sliding rail 1231 may be disposed in the first driven arm 123, and the first sliding rail 1231 may be slidably disposed in the first sliding groove 1212, so as to implement a sliding connection between the first driven arm 123 and the first swing link 121.

In an embodiment, the first sliding groove 1212 may alternatively be disposed on the first driven arm 123, and the first sliding rail 1231 may alternatively be disposed on the first swing link 121. In addition, the first sliding groove 1212 and the first sliding rail 1231 may be in various shapes. For example, in an embodiment of this disclosure, cross sections of the first sliding groove 1212 and the first sliding rail 1231 are cross-shaped. In another embodiment, the cross sections of the first sliding groove 1212 and the first sliding rail 1231 may alternatively be trapezoidal, triangular, or the like. Details are not described in this disclosure.

In addition, to implement the sliding connection between the second driven arm 133 and the second swing link 131, in an embodiment of this disclosure, a second sliding groove 1312 may be disposed in the second swing link 131, a second sliding rail (not shown in the figure) may be disposed in the second driven arm (not shown in the figure), and the second sliding rail may be slidably disposed in the second sliding groove 1312, so as to implement a sliding connection between the second driven arm and the second swing link 131.

In an embodiment, the second sliding groove 1312 may alternatively be disposed on the second driven arm, and the second sliding rail may alternatively be disposed on the second swing link 131. In addition, the second sliding groove 1312 and the second sliding rail may be in various shapes. For example, in an embodiment of this disclosure, cross sections of the second sliding groove 1312 and the second sliding rail are cross-shaped. In another embodiment, the cross sections of the second sliding groove 1312 and the second sliding rail may alternatively be trapezoidal, triangular, or the like. Details are not described in this disclosure.

In addition, in an embodiment, the first support plate 124 and the first swing link 121 may be rotatably connected using a virtual shaft as described above, or may be rotatably connected using a pin shaft, or may be rotatably connected in another manner.

For example, as shown in FIG. 13, in one embodiment of this disclosure, the first support plate 124 and the first swing link 121 is rotatably connected using a virtual shaft. For example, a third arc groove 1213 is disposed on the first swing link 121, and a third arc shaft 1241 matching the third arc groove 1213 is disposed on the first support plate 124, and the third arc shaft 1241 is disposed in the third arc groove 1213, so as to implement a rotational connection between the first support plate 124 and the first swing link 121.

Through the virtual shaft connection, the third arc groove 1213 and the third arc axis 1241 can be well concealed, so that the third arc groove 1213 and the third arc axis 1241 are not exposed, and visual integrity of the hinge 10 can be improved.

In an embodiment, the first support plate 124 and the first swing link 121 may be rotatably connected using a pin shaft, or may be rotatably connected in another manner. This is not specifically limited in this disclosure.

In an embodiment, the second support plate 134 and the second swing link 131 may be rotatably connected using a virtual shaft as described above. In brief, a structure the same as the third arc groove 1213 may be disposed on the second swing link 131, and a structure the same as the third arc shaft 1241 may be disposed on the second support plate 134, so as to implement a rotational connection between the second support plate 134 and the second swing link 131.

To enable the first support plate 124 to rotate relative to the first swing link 121 during folding of the hinge 10, in one embodiment of this disclosure, the first support plate 124 is slidably connected to the first driven arm 123.

For example, as shown in FIG. 13, a third sliding groove 1242 is disposed on the first support plate 124, a positioning shaft 151 is disposed on the first driven arm 123, and the positioning shaft 151 is slidably disposed in the third sliding groove 1242. When a relative sliding movement occurs between the first driven arm 123 and the first swing link 121, the positioning shaft 151 located on the first driven arm 123 pushes against a side wall of the third sliding groove 1242 to rotate the first support plate 124 around the first swing link 121.

In an embodiment, the third sliding groove 1242 may be an arc groove, a rectilinear groove, an irregular curvilinear groove, or the like. In actual disclosure, a shape of the third sliding groove 1242 may be adjusted based on a target movement track of the first support plate 124.

For example, referring to FIG. 12, in an embodiment of this disclosure, after the hinge 10 is folded, the first support plate 124 is rotatably connected to the left end of the first swing link 121 (the third arc groove 1213 is disposed close to the left end of the first swing link 121), so that the first support plate 124, the second support plate 134, and the main body 11 (the inner housing 111) can enclose to form an accommodation space. When the hinge 10 is folded, the first swing link 121 rotates clockwise and slides outward along the first driven arm 123, and the positioning shaft 141 pushes against a side wall of the third sliding groove 1242 and slides inside the third sliding groove 1242, so that the first support plate 124 rotates clockwise relative to the first swing link 121, thereby gradually forming the accommodation space between the first support plate 124 and the main body 11 (the inner housing 111). When the hinge 10 is unfolded, the first swing link 121 rotates counterclockwise and slides inward along the first driven arm 123, and the positioning shaft 141 pushes against a side wall of the third sliding groove 1242 and slides in the third sliding groove 1242, so that the first support plate 124 rotates counterclockwise relative to the first swing link 121. When the hinge 10 is fully unfolded, an upper surface of the first support plate 124 is flush with an upper surface of the main body 11 (inner housing 111), thereby providing a flat support surface for the flexible display.

Figure 14:
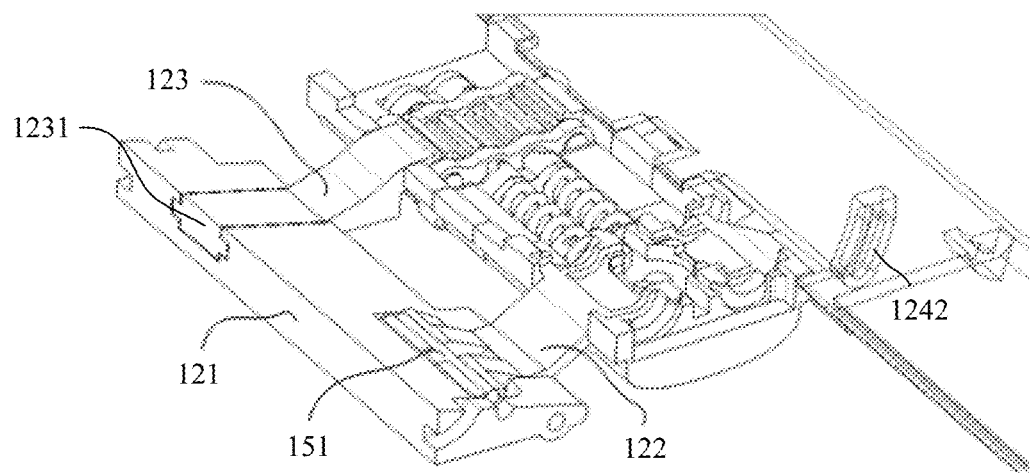
FIG. 14 is a partial schematic structural diagram of a hinge according to an embodiment of this disclosure.

In addition, as shown in FIG. 14, in an embodiment, because the included angle between the first swing arm 122 and the first swing link 121 during unfolding and folding of the hinge 10 is also changed, in an embodiment, the positioning shaft 151 for driving the rotation of the first support plate 124 may alternatively be disposed on the first swing arm 122 and slidably cooperate with the third sliding groove 1242.

In addition, in an embodiment, the third sliding groove 1242 may be disposed on the first driven arm 123 or the first swing arm 122, and the positioning shaft 151 may be disposed on the first support plate 124, so as to implement a sliding connection between the first driven arm 123 and the first support plate 124, or a sliding connection between the first swing arm 122 and the first support plate 124.

As shown in FIG. 13, in an embodiment, a structural composition of the second folding assembly 13 may be the same as that of the first folding assembly 12 and disposed symmetrically relative to the main body 11. In brief, a fourth sliding groove 1342 may be disposed on the second support plate 134, a positioning shaft 152 may be disposed on the second driven arm 133, and the positioning shaft 152 may be slidably disposed in the fourth sliding groove 1342. When a relative sliding movement occurs between the second driven arm 133 and the second swing link 131, the positioning shaft 152 located on the second driven arm 133 pushes against a side wall of the fourth sliding groove 1342 to rotate the second support plate 134 around the second swing link 131. For an operation principle of the second folding assembly 13, reference may be made to related description of the first folding assembly 12. Details are not described herein.

In addition, in an embodiment, to ensure that the first folding assembly 12 and the second folding assembly 13 can synchronously move during folding and unfolding of the hinge 10, in one embodiment of this disclosure, the hinge 10 may further include a synchronization assembly, so as to implement synchronous reverse rotation (synchronous rotation toward each other and synchronous reverse rotation away from each other) between the first folding assembly 12 and the second folding assembly 13.

In an embodiment, the synchronization assembly may be in various structural forms, and may have various connection relationships with the first folding assembly 12 and the second folding assembly 13.

Figure 15:
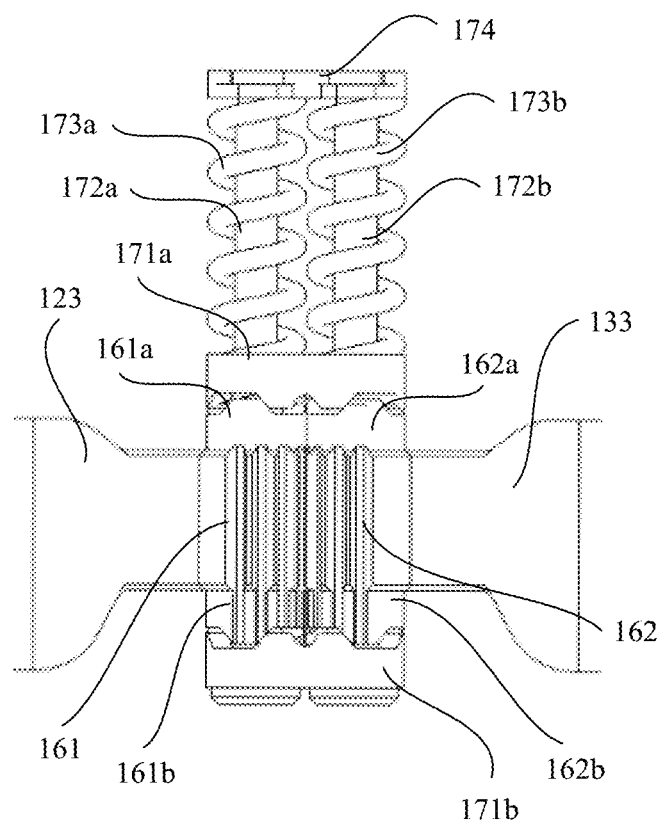
FIG. 15 is a partial schematic structural diagram of a hinge according to an embodiment of this disclosure.

For example, as shown in FIG. 15, in one embodiment of this disclosure, the synchronization assembly may include a gear structure and be drivingly connected to the first driven arm 123 and the second driven arm 133.

For example, the synchronization assembly may include a first gear 161 and a second gear 162 that are engaged with each other, the first gear 161 is fastened to one end of the first driven arm 123 (in an embodiment, the gear structure may alternatively be directly formed at the right end of the first driven arm 123), the second gear 162 is fastened to one end of the second driven arm 133 (in an embodiment, the gear structure may alternatively be directly formed at the left end of the second driven arm 133), an axis of the first gear 161 coincides with a rotation axis of the first driven arm 123 on the main body 11, and an axis of the second gear 162 coincides with a rotation axis of the second driven arm 133 on the main body 11.

In an embodiment, to provide a damping effect or self-hovering capability during folding and unfolding of the hinge 10, the hinge 10 may further include a damping assembly. The damping assembly may be drivingly connected to the first folding assembly 12 and the second folding assembly 13 to provide a damping force or a self-hovering effect when the first folding assembly 12 and the second folding assembly 13 are rotated, so as to improve use experience of a user.

For example, in one embodiment of this disclosure, a cam structure 161a is disposed at one end (upper end in the figure) of the first gear 161, and a cam structure 161b is disposed at the other end (lower end in the figure). A cam structure 162a is disposed at one end (upper end in the figure) of the second gear 162, and a cam structure 162b is provided at the other end (lower end in the figure). A conjoined cam 171a is disposed on the upper side of the cam structure 161a and a cam structure 162a, and a conjoined cam 171b is disposed on the lower side of the cam structure 161b and a cam structure 162b. The conjoined cam 171a is slidable in longitudinal directions (up and down directions in the figure) of the camshaft 172a and the camshaft 172b, the conjoined cam 171b is fastened to the lower ends of the camshaft 172a and the camshaft 172b, and the camshaft 172a and the camshaft 172b are slidable up and down. One end (upper end) of an abutment spring 173a and an abutment spring 173b abuts against the retainer spring 174, and the other end (lower end) abuts against the conjoined cam 171a, so that the conjoined cam 171a abuts against the cam structure 161a and the cam structure 162a, and the conjoined cam 171b abuts against the cam structure 161b and the cam structure 162b. When the first driven arm 123 or the second driven arm 133 is rotated, the synchronous reverse rotation is implemented through engagement between the first gear 161 and the second gear 162, the cam structures 161a and 161b rotate synchronously with the first gear 161, and the cam structures 162a and 162b rotate synchronously with the second gear 162. In this process, the cam structure 161a and the cam structure 162a rotate relative to the conjoined cam 171a, and the cam structure 161b and the cam structure 162b rotate relative to the conjoined cam 171b. When the convex portions of the cam structure 161a and the cam structure 162a tend to slide out of the concave portions of the conjoined cam 171a, and the convex portions of the cam structure 161*b* and the cam structure 162*b* tend to slide out of the concave portions of the conjoined cam 171*b*, the abutment spring 173*a* and the abutment spring 173*b* are compressed, so that a certain damping force can be provided, and the convex portions of the cam structure 161*a* and the cam structure 162*a* can be held in the concave portions of the conjoined cam 171*a* to a certain extent, and the convex portions of the cam structure 161*b* and the cam structure 162*b* can be held in the concave portions of the conjoined cam 171*b* to achieve a self-hovering effect.

For example, when the hinge 10 is in a fully unfolded state (or the mobile terminal is in the fully unfolded state), the convex portions of the cam structure 161*a* and the cam structure 162*a* may be located just inside the concave portion of the conjoined cam 171*a*, and the convex portions of the cam structure 161*b* and the cam structure 162*b* may be located just inside the concave portion of the conjoined cam 171*b*, so that the hinge 10 (or the mobile terminal) can maintain the specific angle, and when the user operates the mobile terminal (for example, touches or presses the flexible display), the mobile terminal is not easily folded under the external force, so as to improve use experience of the user. Alternatively, when the hinge 10 is in a fully folded state (or the mobile terminal is in the fully folded state), the convex portions of the cam structure 161*a* and the cam structure 162*a* may be located just inside the concave portion of the conjoined cam 171*a*, and the convex portions of the cam structure 161*b* and the cam structure 162*b* may be located just inside the concave portion of the conjoined cam 171*b*, so that the hinge 10 (or the mobile terminal) can maintain the specific angle, thereby preventing the mobile terminal from being freely unfolded under the external force, thereby ensuring safety of the mobile terminal. In an embodiment, the cam structure 161*a*, the cam structure 161*b*, the first gear 161, and the first driven arm 123 may be an integral structure or may be separate structural members. Correspondingly, the cam structure 162*a*, the cam structure 162*b*, the second gear 162, and the second driven arm 133 may be an integral structure or may be separate structural members. In addition, in an embodiment, the damping assembly is not limited to the structural form disclosed in the foregoing embodiment. For example, the cam structure 161*b*, the cam structure 162*b*, and the conjoined cam 171*b* may be omitted.

In addition, in an embodiment, the synchronization assembly is not limited to the structure disclosed in the foregoing embodiment. For example, a pulley mechanism or another drive mechanism may be used between the first driven arm 123 and the second driven arm 133 to implement synchronous rotation; or more gears may be added between the first gear 161 and the second gear 162.

Figure 16:
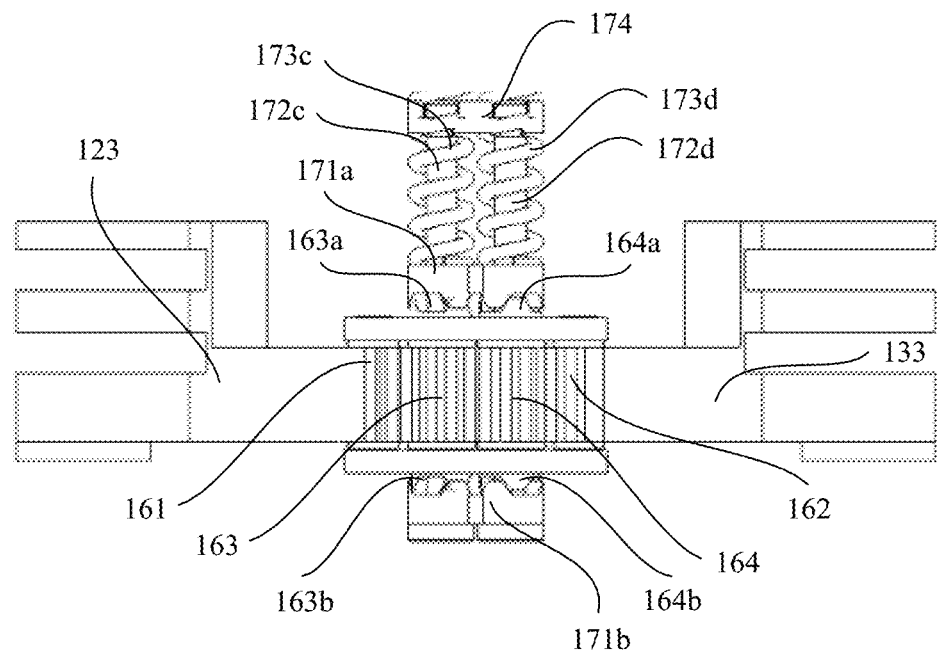
FIG. 16 is a partial schematic structural diagram of another hinge according to an embodiment of this disclosure.

For example, as shown in FIG. 16, in another embodiment of this disclosure, a driven gear 163 and a driven gear 164 that are engaged with each other are provided between the first gear 161 and the second gear 162, the driven gear 163 is engaged with the first gear 161, and the driven gear 164 is engaged with the second gear 162; that is, the first driven arm 123 and the second driven arm 133 rotate synchronously through the first gear 161, the second gear 162, the driven gear 163, and the driven gear 164.

The damping assembly may be disposed as follows: A cam structure 163*a* is disposed at one end (upper end in the figure) of the driven gear 163, and a cam structure 163*b* is disposed at the other end (lower end in the figure); a cam structure 164*a* is disposed at one end (upper end in the figure) of the driven gear 164, and a cam structure 164*b* is disposed at the other end (lower end in the figure); and the conjoined cam 171*a* is disposed on the upper side of the cam structure 163*a* and the cam structure 164*a*, and the conjoined cam 171*b* is disposed on the lower side of the cam structure 163*b* and the cam structure 164*b*. The conjoined cam 171*a* is slidable in longitudinal directions (up and down directions in the figure) of the camshaft 172*c* and the camshaft 172*d*, the conjoined cam 171*b* is fastened to the lower ends of the camshaft 172*c* and the camshaft 172*d*, and the camshaft 172*c* and the camshaft 172*d* are slidable up and down. One end (upper end) of the abutment spring 173*c* and the abutment spring 173*d* abuts against the retainer spring 174, and the other end (lower end) abuts against the conjoined cam 171*a*, so that the conjoined cam 171*a* abuts against the cam structure 163*a* and the cam structure 164*a*, and the conjoined cam 171*b* abuts against the cam structure 163*b* and the cam structure 164*b*. When the first driven arm 123 or the second driven arm 133 is rotated, synchronous reverse rotation is implemented through engagement between the first gear 161, the driven gear 163, the driven gear 164, and the second gear 162, the cam structures 163*a* and 163*b* rotate synchronously with the driven gear 163, and the cam structures 164*a* and 164*b* rotate synchronously with the driven gear 164. In this process, the cam structure 163*a* and the cam structure 164*a* rotate relative to the integral cam 171*a*, and the cam structure 163*b* and the cam structure 164*b* rotate relative to the integral cam 171*b*; when the convex portions of the cam structure 163*a* and the cam structure 164*a* tend to slide out of the concave portions of the conjoined cam 171*a*, and the cam structure 163*b*, and the convex portions of the cam structure 164*b* tend to slide out of the concave portions of the conjoined cam 171*b*, the abutment spring 173*c* and the abutment spring 174*d* are compressed, so that a certain damping force can be provided, and to some extent, the convex portions of the cam structure 163*a* and the cam structure 164*a* can be held in the concave portions of the conjoined cam 171*a*, and the convex portions of the cam structure 163*b* and the cam structure 164*b* can be held in the concave portions of the conjoined cam 171*b* to achieve a self-hovering effect.

In an embodiment, the number of components in a damping assembly may also be increased or decreased.

Figure 17:
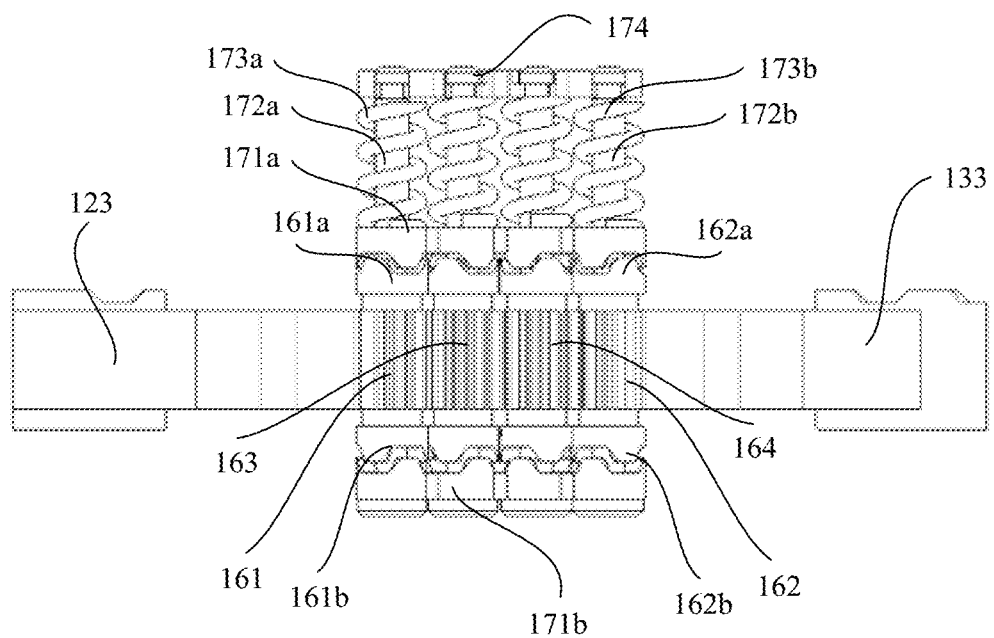
FIG. 17 is a partial schematic structural diagram of still another hinge according to an embodiment of this disclosure.

For example, as shown in FIG. 17, in one embodiment of this disclosure, to provide a greater damping effect and a more stable self-hovering effect for the hinge 10, the first gear 161, the second gear 162, the driven gear 163, and the driven gear 164 are provided with a cam structure at both the upper end and the lower end, and are provided with a conjoined cam adapted to the cam structure at the upper end. For the operation principle, reference may be made to the description in the foregoing embodiment. Details are not described herein.

It can be understood that, in an embodiment, the damping assembly is not limited to the foregoing structural form, but another structural form may be used to provide a certain rotational damping force for the hinge 10 or implement a self-hovering function. This is not specifically limited in this disclosure.

In addition, in an embodiment, the damping assembly may be drivingly connected to the first swing arm 122, the second swing arm 132, or another movable member in addition to the first driven arm 123 and the second driven arm 133.

In addition, in an embodiment, the first folding assembly 12 may include one or more first swing links 121, first swing arms 122, first driven arms 123, first support plates 124, and the like. The second folding assembly 13 may also include one or more second swing links 131, second swing arms 132, second driven arms 133, second support plates 134, and the like. In addition, the hinge 10 may also include a plurality of synchronization assemblies or damping assemblies described above.

Figure 18:
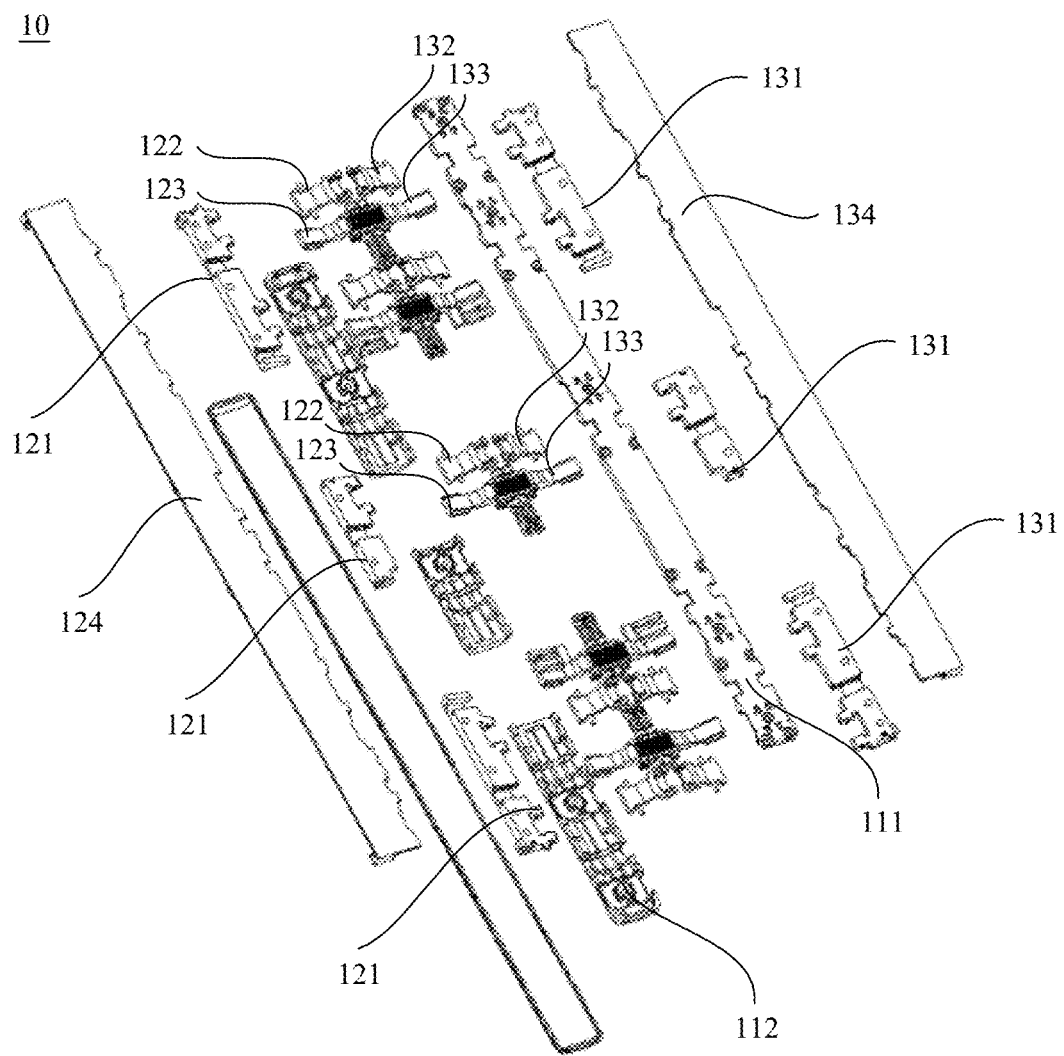
FIG. 18 is a schematic diagram of structure decomposition of a hinge according to an embodiment of this disclosure.

For example, as shown in FIG. 18, the first folding assembly 12 may include one first support plate 124 and three first swing links 121, where two first swing links 121 may be disposed at both ends of the first support plate 124, and the other first swing link 121 may be disposed at the middle of the first support plate 124. In addition, the first folding assembly 12 may include a plurality of first swing arms 122 and a plurality of first driven arms 123, each of the first swing links 121 is rotatably connected to one or more first swing arms 122, and each of the first swing links 121 is slidably connected to the plurality of first driven arms 123.

In addition, the second folding assembly 13 may also include one second support plate 134 and three second swing links 131, where two second swing links 131 may be disposed at both ends of the second support plate 134, and the other second swing link 131 may be disposed at the middle of the second support plate 134. In addition, the second folding assembly 13 may include a plurality of second swing arms 132 and a plurality of second driven arms 133, each second swing link 131 is rotatably connected to one or more second swing arms 132, and each second swing link 131 is slidably connected to the plurality of second driven arms 133.

In addition, in an embodiment, one or more synchronization assemblies and damping assemblies may be disposed.

For example, the number of synchronization assemblies disposed may be the same as the number of the first driven arms 123 (or the second driven arms 133), and the number of damping assemblies disposed may be the same as or different from the number of synchronization assemblies disposed.

In actual disclosure, the hinge 10 may be used in a variety of mobile terminals that require folding through the hinge 10.

Figure 19:
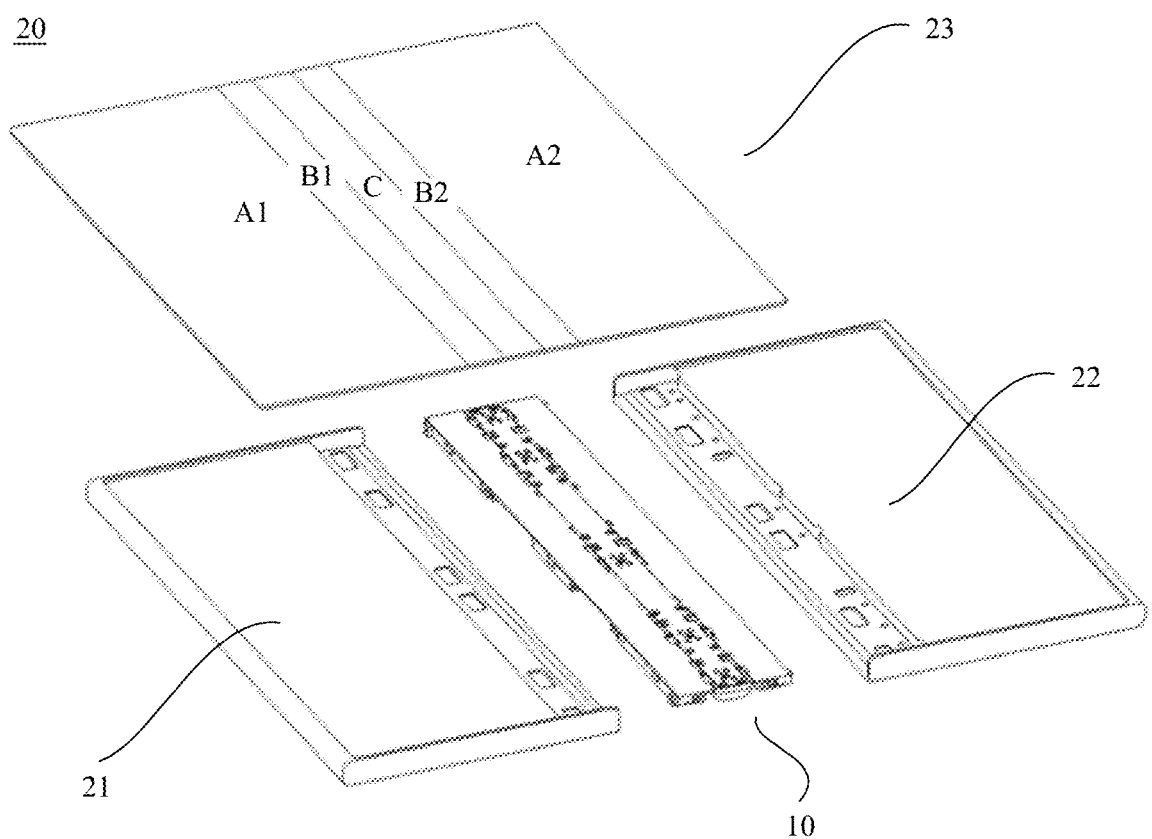
FIG. 19 is a schematic diagram of structure decomposition of a mobile terminal according to an embodiment of this disclosure.

For example, as shown in FIG. 19, a mobile terminal 20 according to an embodiment of this disclosure includes a first housing 21, a second housing 22, a flexible display 23, and any one of the foregoing hinges 10; and the first housing 21 and the second housing 22 are rotatably connected using a hinge 10.

In an embodiment, the first housing 21 may be fixedly connected to the first swing link 121, and the second housing 22 may be fixedly connected to the second swing link 131. For example, the first housing 21 may be fixedly connected to the first swing link 121 by using screws or through welding, bonding, or the like, and the second housing 22 may be fixedly connected to the second swing link 131 by using screws or through welding, bonding, or the like. In actual disclosure, devices such as a processor, a battery, and a camera may be disposed in the first housing 21 and the second housing 22.

In addition, in an embodiment, the mobile terminal may include a flexible display 23 (for example, an OLED display), where a part of the flexible display 23 may be fixedly connected to the first housing 21, and another part may be fixedly connected to the second housing 22.

Figure 20:
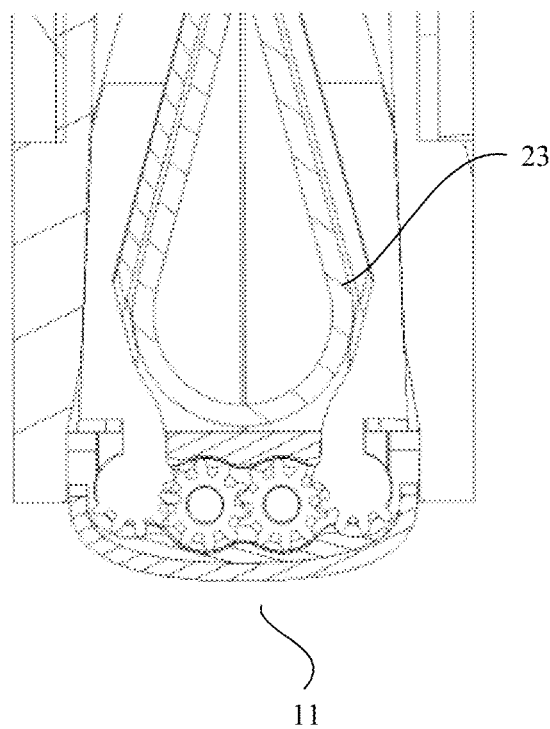
FIG. 20 is a local schematic cross-sectional structural diagram of a mobile terminal according to an embodiment of this disclosure.

In an embodiment, a part of the flexible display 23 (for example, a region A1) may be adhered to the first housing 21, and a part of the flexible display 23 (for example, a region A2) may be adhered to the second housing 22. During folding and unfolding of the hinge 10, the length of the hinge 10 can be extended or reduced as the folding angle changes, the first swing link 121 is fixedly connected to the first housing 21, and the second swing link 131 is fixedly connected to the second housing 22. Therefore, during folding and unfolding of the mobile terminal 20, the length of the connection between the first housing 21, the hinge 10, and the second housing 22 is extended or reduced, so that neither pressing force nor stretching force is imposed on the flexible display 23. For example, when the mobile terminal 20 is gradually unfolded, the length of the hinge 10 is gradually reduced. When the mobile terminal 20 is fully unfolded (an included angle between the first housing 21 and the second housing 22 is 180°), the length of the hinge 10 is the same as the length of the flexible display 23 including regions B1, C, and B2. In addition, the first support plate 124, the inner housing 111, and the second support plate 134 form a flat support surface, so that a good supporting function can be provided for the flexible display 23 (regions B1, C, and B2). Referring to FIG. 20, when the mobile terminal 20 is gradually folded, the length of the hinge 10 is gradually extended, thereby ensuring that no compressive force is imposed on the flexible display 23 (regions B1, C, and B2). In addition, the first support plate 124, the inner housing 111, and the second support plate 134 gradually enclose to form an accommodation space for accommodating the regions B1, C, and B2 (the cross-section of the accommodation space may be similar to a water drop shape), so as to prevent the flexible display 23 from being bent at a large angle, thereby avoiding occurrence of undesirable phenomena such as creases.

In an embodiment, the flexible display 23 may also be fixedly attached to the first support plate 124 and the second support plate 134. In an embodiment, a part of the flexible display 23 (for example, the region B1) may be adhered to the first support plate 124, and a part of the flexible display 23 (for example, the region B2) may be adhered to the second support plate 134. Because the first swing link 121 can generate a sliding action relative to the main body 11 (the first driven arm 123) during folding and unfolding of the hinge 10, the second swing link 131 can generate a sliding action relative to the main body 11 (the second driven arm 133), the first support plate 124 is rotatably disposed on the first swing link 121, and the second support plate 134 is rotatably disposed on the second swing link 131, the first swing link 121 can generate a sliding and a rotation action relative to the main body 11, and the second swing link 131 can generate a sliding and a rotation action relative to the main body 11. Therefore, in the folding process and unfolding process, the movement tracks of the first support plate 124 and the second support plate 134 naturally follow the folding and unfolding tracks of the flexible display 23, so as to avoid undesirable effects such as stretching and compression of the flexible display. In addition, the shape of the bending region (region C) of the flexible display can be effectively controlled, thereby improving use effect and stability of the mobile terminal 20.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:
1. A hinge, comprising:
  a main body;
  a first folding assembly, comprising:
    a first swing link;

a first swing arm, wherein one end of the first swing arm is rotatably connected to the main body, and the other end of the first swing arm is rotatably connected to the first swing link;

a first driven arm, wherein one end of the first driven arm is rotatably connected to the main body, and the other end of the first driven arm is slidably connected to the first swing link, wherein a rotation axis of the first driven arm relative to the main body and a rotation axis of the first swing arm relative to the main body are parallel to each other and do not coincide; and a first support plate rotatably connected to the first swing link, wherein the first support plate is slidably connected to the first driven arm or slidably connected to the first swing arm; and a second folding assembly, the first folding assembly and the second folding assembly being disposed on two sides of the main body, wherein the second folding assembly comprises:

a second swing link;

a second swing arm, wherein one end of the second swing arm is rotatably connected to the main body, and the other end of the second swing arm is rotatably connected to the second swing link;

a second driven arm, wherein one end of the second driven arm is rotatably connected to the main body, and the other end of the second driven arm is slidably connected to the second swing link, wherein a rotation axis of the second driven arm relative to the main body and a rotation axis of the second swing arm relative to the main body are parallel to each other and do not coincide; and a second support plate rotatably connected to the second swing link, wherein the second support plate is slidably connected to the second driven arm or slidably connected to the second swing arm, wherein when the hinge is unfolded, the first support plate, the second support plate, and the main body are flattened to form a support surface; and when the hinge is folded, the first support plate, the second support plate, and the main body jointly form a display accommodation space, a distance between an end of the first support plate near the main body and an end of the second support plate near the main body is greater than a distance between an end of the first support plate away from the main body and an end of the second support plate away from the main body.

2. The hinge according to claim 1, wherein during folding of the hinge, the first swing link rotates clockwise and the second swing link rotates counterclockwise, the first swing link drives the first driven arm to rotate by sliding relative to the first driven arm in a direction away from the main body, the second swing link drives the second driven arm to rotate by sliding relative to the second driven arm in a direction away from the main body, so as to increase a length of the hinge; and the first support plate rotates clockwise relative to the first swing link, and the second support plate rotates counterclockwise relative to the second swing link, such that the first support plate, the second support plate and the main body form an accommodation space; and during unfolding of the hinge, the first swing link rotates counterclockwise and the second swing link rotates clockwise, the first swing link drives the first driven arm to rotate by sliding relative to the first driven arm in a direction close to the main body, the second swing link drives the second driven arm to rotate by sliding relative to the second driven arm in a direction close to the main body, so as to reduce the length of the hinge; and the first support plate rotates counter clockwise relative to the first swing link, and the second support plate rotates clockwise relative to the second swing link, such that the first support plate, the second support plate and the main body are flattened to form a support surface.

3. The hinge according to claim 1, further comprising:

a first arc groove and a second arc groove disposed on the main body; and a first arc shaft disposed at one end of the first swing arm, and a second arc shaft disposed at one end of the second swing arm, wherein the first arc shaft is disposed in the first arc groove, so as to implement a rotational connection between the first swing arm and the main body, and the second arc shaft is disposed in the second arc groove, so as to implement a rotational connection between the second swing arm and the main body.

4. The hinge according to claim 3, wherein the main body comprises an inner housing and an outer housing, wherein:

an inner housing having arc projections disposed therein; and an outer housing having two arc recess are disposed in the outer housing, and two arc projections are disposed in the inner housing therein, wherein the outer housing and the inner housing are snap-fit and fastened, the arc recesses and the arc projectionesprojections are snap-fit to form the first arc groove and the second arc groove.

5. The hinge according to claim 1, further comprising:

a first shaft hole disposed on the first swing arm;

a second shaft hole disposed on the first swing link, wherein the first shaft hole and the second shaft hole are connected using a pin shaft to form a rotational connection between the first swing arm and the first swing link;

a third shaft hole disposed on the second swing arm; and a fourth shaft hole disposed on the second swing link, wherein the third shaft hole and the fourth shaft hole are connected using a pin shaft to form a rotational connection between the second swing arm and the second swing link.

6. The hinge according to claim 1, further comprising:

a first sliding groove disposed on the first swing link;

a first sliding rail disposed on the first driven arm, wherein the first sliding rail is slidably disposed in the first sliding groove to form a sliding connection between the first swing link and the first driven arm;

a second sliding groove disposed on the second swing link; and a second sliding rail disposed on the second driven arm, wherein the second sliding rail is slidably disposed in the second sliding groove to form a sliding connection between the second swing link and the second driven arm.

7. The hinge according to claim 1, further comprising:

a third arc groove disposed on the first swing link;

a third arc shaft are disposed on the first support plate, wherein the third arc shaft is disposed in the third arc groove to form a rotational connection between the first swing link and the first support plate;

a fourth arc groove disposed on the second swing link; and a fourth arc shaft disposed on the second support plate, wherein the fourth arc shaft is disposed in the fourth arc groove to form a rotational connection between the second swing link and the second support plate.

8. The hinge according to claim 1, further comprising:
a third sliding groove disposed on the first support plate;
a first positioning shaft disposed on the first driven arm, wherein the first positioning shaft is slidably disposed in the third sliding groove to form a sliding connection between the first swing arm or the first driven arm and the first support plate;
a fourth sliding groove disposed on the second support plate; and
a second positioning shaft disposed on the second driven arm, wherein the second positioning shaft is slidably disposed in the fourth sliding groove to form a sliding connection between the second swing arm or the second driven arm and the second support plate.

9. The hinge according to claim 1, further comprising:
a synchronization assembly drivingly connected to the first driven arm and the second driven arm for implementing synchronous reverse rotation between the first folding assembly and the second folding assembly, wherein the synchronization assembly comprises a first gear, a second gear, and an even number of driven gears, and the first gear and the second gear are drivingly connected using the even number of driven gears;
the first gear is fastened to one end of the first driven arm, and the second gear is fastened to one end of the second driven arm; and
the first gear and the second gear are rotatably connected to the main body, wherein an axis of the first gear coincides with the rotation axis of the first driven arm relative to the main body, and an axis of the second gear coincides with the rotation axis of the second driven arm relative to the main body.

10. The hinge according to claim 9, further comprising:
a damping assembly drivingly connected to the first folding assembly and the second folding assembly, so as to provide a damping force when the first folding assembly and the second folding assembly are relatively rotated, wherein the damping assembly is located in the main body, one end of the damping assembly elastically presses against the first driven arm and the second driven arm.

11. The hinge according to claim 10, further comprising, along a length direction of the main body, a first cam structure disposed at two ends of the first gear, and a second cam structure disposed at two ends of the second gear; wherein
the damping assembly comprises a first conjoined cam, a second conjoined cam, a first spring, and a second spring;
along the length direction of the main body, the first conjoined cam and the second conjoined cam are disposed on two sides of the synchronization assembly, and the first spring and the second spring are disposed on a side of the first conjoined cam away from the second conjoined cam; the first conjoined cam abuts against the first cam structure and the second cam structure disposed on a same side, and the second conjoined cam abuts against the first cam structure and the second cam structure disposed on a same side;
along the length direction of the main body, a first camshaft penetrates through the first conjoined cam, the second conjoined cam, and the first gear, and a second camshaft penetrates through the first conjoined cam, the second conjoined cam, and the second gear, the first spring is sleeved on the first camshaft, and the second spring is sleeved on the second camshaft; and the first spring and the second spring elastically press against the first conjoined cam.

12. The hinge according to claim 1, wherein a projection of the first swing arm and the first driven arm on the first support plate is located between two ends in a length direction of the first support plate, and a projection of the second swing arm and the second driven arm on the second support plate is located between two ends in a length direction of the second support plate.

13. A mobile terminal, comprising:
a first housing, a second housing, a flexible display, and a hinge, wherein the first housing and the second housing enable relative folding and unfolding by using the hinge, and wherein the hinge comprises:
a main body,
a first folding assembly, comprising:
a first swing link;
a first swing arm, wherein one end of the first swing arm is rotatably connected to the main body, and the other end of the first swing arm is rotatably connected to the first swing link;
a first driven arm, wherein one end of the first driven arm is rotatably connected to the main body, and the other end of the first driven arm is slidably connected to the first swing link, wherein a rotation axis of the first driven arm relative to the main body and a rotation axis of the first swing arm relative to the main body are parallel to each other and do not coincide; and
a first support plate rotatably connected to the first swing link, wherein the first support plate is slidably connected to the first driven arm or slidably connected to the first swing arm; and
a second folding assembly, the first folding assembly and the second folding assembly being disposed on two sides of the main body, wherein the second folding assembly comprises:
a second swing link;
a second swing arm, wherein one end of the second swing arm is rotatably connected to the main body, and the other end of the second swing arm is rotatably connected to the second swing link;
a second driven arm, wherein one end of the second driven arm is rotatably connected to the main body, and the other end of the second driven arm is slidably connected to the second swing link, wherein a rotation axis of the second driven arm relative to the main body and a rotation axis of the second swing arm relative to the main body are parallel to each other and do not coincide; and
a second support plate rotatably connected to the second swing link, wherein the second support plate is slidably connected to the second driven arm or slidably connected to the second swing arm, wherein
when the hinge is unfolded, the first support plate, the second support plate, and the main body are flattened to form a support surface;
when the hinge is folded, the first support plate, the second support plate, and the main body jointly form a display accommodation space, a distance between an end of the first support plate near the main body and an end of the second support plate near the main body is greater than a distance between an end of the first support plate away from the main body and an end of the second support plate away from the main body, wherein the first housing is fixedly connected to the first swing link, and the second housing is fixedly connected to the second swing link;

the flexible display covers one side of the first housing, the second housing, the first support plate, the second support plate, and the main body; and at least a part of the flexible display is fixedly connected to the first housing, and at least a part of the flexible display is fixedly connected to the second housing.

14. The mobile terminal according to claim 13, wherein the flexible display is fixedly connected to the first support plate and the second support plate.

15. The mobile terminal according to claim 13, wherein during folding of the hinge, the first swing link rotates clockwise and the second swing link rotates counterclockwise, the first swing link drives the first driven arm to rotate by sliding relative to the first driven arm in a direction away from the main body, the second swing link drives the second driven arm to rotate by sliding relative to the second driven arm in a direction away from the main body, so as to increase a length of the hinge;

the first support plate rotates clockwise relative to the first swing link, and the second support plate rotates counterclockwise relative to the second swing link, such that the first support plate, the second support plate and the main body form an accommodation space;

during unfolding of the hinge, the first swing link rotates counterclockwise and the second swing link rotates clockwise, the first swing link drives the first driven arm to rotate by sliding relative to the first driven arm in a direction close to the main body, the second swing link drives the second driven arm to rotate by sliding relative to the second driven arm in a direction close to the main body, so as to reduce the length of the hinge; and the first support plate rotates counter clockwise relative to the first swing link, and the second support plate rotates clockwise relative to the second swing link, such that the first support plate, the second support plate and the main body are flattened to form a support surface.

16. The mobile terminal according to claim 13, wherein the hinge further comprises:

a first arc groove and a second arc groove disposed on the main body;

a first arc shaft disposed at one end of the first swing arm, and a second arc shaft disposed at one end of the second swing arm; wherein the first arc shaft is disposed in the first arc groove, so as to implement a rotational connection between the first swing arm and the main body; and the second arc shaft is disposed in the second arc groove, so as to implement a rotational connection between the second swing arm and the main body.

17. The mobile terminal according to claim 16, wherein the main body comprises:

an inner housing and an outer housing, wherein two arc recess are disposed in the outer housing, and two arc projections are disposed in the inner housing, the outer housing and the inner housing are snap-fit and fastened, the arc recesses and the arc projections are snap-fit to form the first arc groove and the second arc groove.

18. The mobile terminal e according to claim 13, wherein the hinge further comprises:

a first shaft hole disposed on the first swing arm, and a second shaft hole disposed on the first swing link; wherein the first shaft hole and the second shaft hole are connected using a pin shaft to enable a rotational connection between the first swing arm and the first swing link; and a third shaft hole disposed on the second swing arm, and a fourth shaft hole disposed on the second swing link, wherein the third shaft hole and the fourth shaft hole are connected using a pin shaft to enable a rotational connection between the second swing arm and the second swing link.

19. The mobile terminal according to claim 13, wherein the hinge further comprises:

a first sliding groove and a first sliding rail disposed on the first swing link and the first driven arm respectively, wherein the first sliding rail is slidably disposed in the first sliding groove, so as to implement a sliding connection between the first swing link and the first driven arm; and a second sliding groove and a second sliding rail disposed on the second swing link and the second driven arm respectively, wherein the second sliding rail is slidably disposed in the second sliding groove, so as to implement a sliding connection between the second swing link and the second driven arm.

20. The mobile terminal according to claim 13, wherein the hinge further comprises:

a third arc groove and a third arc shaft disposed on the first swing link and the first support plate respectively, wherein the third arc shaft is disposed in the third arc groove, so as to implement a rotational connection between the first swing link and the first support plate; and a fourth arc groove and a fourth arc shaft disposed on the second swing link and the second support plate respectively, wherein the fourth arc shaft is disposed in the fourth arc groove, so as to implement a rotational connection between the second swing link and the second support plate.

21. The mobile terminal according to claim 13, wherein the hinge further comprises:

a third sliding groove disposed on the first support plate;

a first positioning shaft disposed on the first driven arm, wherein the first positioning shaft is slidably disposed in the third sliding groove to form a sliding connection between the first swing arm or the first driven arm and the first support plate;

a fourth sliding groove disposed on the second support plate; and a second positioning shaft disposed on the second driven arm, wherein the second positioning shaft is slidably disposed in the fourth sliding groove to form a sliding connection between the second swing arm or the second driven arm and the second support plate.

22. The mobile terminal according to claim 13, wherein the hinge further comprises:

a synchronization assembly drivingly connected to the first driven arm and the second driven arm for implementing synchronous reverse rotation between the first folding assembly and the second folding assembly, wherein the synchronization assembly comprises a first gear, a second gear, and an even number of driven gears, and the first gear and the second gear are drivingly connected using the even number of driven gears;

the first gear is fastened to one end of the first driven arm, and the second gear is fastened to one end of the second driven arm; and the first gear and the second gear are rotatably connected to the main body, wherein an axis of the first gear coincides with the rotation axis of the first driven arm relative to the main body, and an axis of the second gear coincides with the rotation axis of the second driven arm relative to the main body.

23. The mobile terminal according to claim 22, wherein the hinge further comprises a damping assembly drivingly connected to the first folding assembly and the second folding assembly, so as to provide a damping force when the first folding assembly and the second folding assembly are relatively rotated, wherein the damping assembly is located in the main body, wherein one end of the damping assembly elastically presses against the first driven arm and the second driven arm.

24. The mobile terminal according to claim 23, wherein along a length direction of the main body, a first cam structure is disposed at two ends of the first gear, and a second cam structure is disposed at two ends of the second gear;
- the damping assembly comprises a first conjoined cam, a second conjoined cam, a first spring, and a second spring;
- along the length direction of the main body, the first conjoined cam and the second conjoined cam are disposed on two sides of the synchronization assembly, and the first spring and the second spring are disposed on a side of the first conjoined cam away from the second conjoined cam;
- the first conjoined cam abuts against the first cam structure and the second cam structure disposed on a same side, and the second conjoined cam abuts against the first cam structure and the second cam structure disposed on a same side;
- along the length direction of the main body, a first camshaft penetrates through the first conjoined cam, the second conjoined cam and the first gear, and a second camshaft penetrates through the first conjoined cam, the second conjoined cam and the second gear, the first spring is sleeved on the first camshaft, and the second spring is sleeved on the second camshaft; and
- the first spring and the second spring elastically press against the first conjoined cam.

25. The mobile terminal according to claim 13, wherein a projection of the first swing arm and the first driven arm on the first support plate is located between two ends in a length direction of the first support plate, and a projection of the second swing arm and the second driven arm on the second support plate is located between two ends in a length direction of the second support plate.

* * * * *

UNITED STATES PATENT AND TRADEMARK OFFICE
CERTIFICATE OF CORRECTION

| | | |
|---|---|---|
| PATENT NO. | : 12,332,703 B2 | Page 1 of 1 |
| APPLICATION NO. | : 18/420170 | |
| DATED | : June 17, 2025 | |
| INVENTOR(S) | : Changliang Liao et al. | |

It is certified that error appears in the above-identified patent and that said Letters Patent is hereby corrected as shown below:

In the Claims

In Column 22, Claim 4, Line 30, delete "the arc projectionesprojections are snap-fit" and insert --the arc projections are snap-fit--.

In Column 25, Claim 18, Line 63, delete "terminal e according to claim 13" and insert --terminal according to claim 13--.

Signed and Sealed this
Nineteenth Day of August, 2025

Coke Morgan Stewart
*Acting Director of the United States Patent and Trademark Office*